(12) United States Patent
Nakano et al.

(10) Patent No.: US 10,406,931 B2
(45) Date of Patent: Sep. 10, 2019

(54) INFORMATION OUTPUT METHOD, INFORMATION PRESENTATION DEVICE, AND INFORMATION OUTPUT SYSTEM

(71) Applicant: Panasonic Intellectual Property Corporation of America, Torrance, CA (US)

(72) Inventors: Toshihisa Nakano, Osaka (JP); Hiroshi Amano, Osaka (JP); Takako Hirose, Kyoto (JP); Motoji Ohmori, Osaka (JP); Masayuki Kozuka, Osaka (JP); Mamoru Yoshida, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/550,740

(22) Filed: Nov. 21, 2014

(65) Prior Publication Data

US 2015/0149015 A1    May 28, 2015

(30) Foreign Application Priority Data

Nov. 28, 2013 (JP) .................... 2013-246559

(51) Int. Cl.
    *B60L 11/18*    (2006.01)
    *B60L 53/80*    (2019.01)
    (Continued)

(52) U.S. Cl.
    CPC .......... *B60L 11/1861* (2013.01); *B60L 53/65* (2019.02); *B60L 53/80* (2019.02); *B60L 58/12* (2019.02);
    (Continued)

(58) Field of Classification Search
    None
    See application file for complete search history.

(56) References Cited

U.S. PATENT DOCUMENTS

2009/0198372 A1* 8/2009 Hammerslag ....... B60L 11/1822
                                                    700/226
2010/0114800 A1* 5/2010 Yasuda ................. B60L 11/182
                                                    705/412
(Continued)

FOREIGN PATENT DOCUMENTS

CN    101728566 A    6/2010
CN    102209904 A   10/2011
(Continued)

OTHER PUBLICATIONS

Chinese Search Report, dated Dec. 4, 2017, for the related Chinese Patent Application No. 2014106433834.

*Primary Examiner* — Abby Y Lin
*Assistant Examiner* — Kyung J Kim
(74) *Attorney, Agent, or Firm* — Greenblum & Bernstein, P.L.C.

(57) ABSTRACT

Provided is an information output method that outputs information when swapping a secondary battery for powering a vehicle. The information output method includes comparing a rank related to the performance of a first battery unit (battery unit A) on board a vehicle to a rank related to the performance of a second battery unit (battery unit B) that is installable in the vehicle in place of the first battery unit, and outputting output information according to a result of the comparison in the comparing step.

21 Claims, 19 Drawing Sheets

(51) Int. Cl.
*B60L 53/65* (2019.01)
*B60L 58/12* (2019.01)

(52) U.S. Cl.
CPC .......... *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/124* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2010/0141206 A1* | 6/2010 | Agassi | B60K 1/04 320/109 |
| 2011/0205048 A1* | 8/2011 | Lentz | B60L 11/1861 340/461 |
| 2011/0218703 A1 | 9/2011 | Uchida | |
| 2014/0019001 A1 | 1/2014 | Nishizawa | |

FOREIGN PATENT DOCUMENTS

| | | |
|---|---|---|
| JP | 2010-259252 A | 11/2010 |
| JP | 2012-211903 | 11/2012 |
| WO | 2012/133212 A1 | 10/2012 |

\* cited by examiner

FIG. 3

| BATTERY UNIT ID | LAYOUT | CHARGE LEVEL | HISTORY INFORMATION ||||||
|---|---|---|---|---|---|---|---|---|
| | | | CHARGE COUNT | FAST CHARGE COUNT | FULL CHARGE RATIO | LOW CHARGE COUNT | HIGH TEMPERATURE PERIOD | AGE |
| PBRX220-201310012222 | 3-3 | 20% | 10 | 0 | 99% | 0 | 0H | 1M |
| PBRX220-201310012543 | 3-4 | 20% | 10 | 0 | 99% | 0 | 0H | 1M |
| ... | | | ... | ... | ... | ... | ... | ... |

| BATTERY UNIT ID 701 | TYPE 702 | LOCATION CATEGORY 703 | LOCATION ID 704 | LAYOUT 705 | CHARGE LEVEL 706 | HISTORY INFORMATION 710 ||||| |
|---|---|---|---|---|---|---|---|---|---|---|
| | | | | | | CHARGE COUNT 711 | FAST CHARGE COUNT 712 | FULL CHARGE RATIO 713 | LOW CHARGE COUNT 714 | HIGH TEMPERATURE PERIOD 715 | AGE 716 |
| PBRX220-20131001222 | T2 | VEHICLE | TYCR300020130808112 | 3-3 | 20% | 10 | 0 | 99% | 0 | 0H | 1M |
| PBRX220-201310012543 | T2 | VEHICLE | TYCR300020130808112 | 3-4 | 20% | 10 | 0 | 99% | 0 | 0H | 1M |
| ⋮ | ⋮ | ⋮ | ⋮ | ⋮ | ⋮ | ⋮ | ⋮ | ⋮ | ⋮ | ⋮ | ⋮ |
| CV333-201108ZYXRB3 | T2 | SWAP STATION | ST00200020110008010 | 151-24 | 91% | 90 | 10 | 98% | 0 | 0H | 2M |
| CV333-201108ZYABC4 | T2 | SWAP STATION | ST00200020110008010 | 151-25 | 90% | 110 | 25 | 96% | 1 | 5H | 9M |
| ⋮ | ⋮ | ⋮ | ⋮ | ⋮ | ⋮ | ⋮ | ⋮ | ⋮ | ⋮ | ⋮ | ⋮ |

FIG. 5

| VEHICLE ID (801) | CURRENT POSITION (802) | DESTINATION (803) |
|---|---|---|
| TYCR300020130808112 | lat-dd.mm.ss.sss<br>lon-dd.mm.ss.sss | lat-dd.mm.ss.sss<br>lon-dd.mm.ss.sss |
| TYCR300020130808115 | lat-dd.mm.ss.sss<br>lon-dd.mm.ss.sss | lat-dd.mm.ss.sss<br>lon-dd.mm.ss.sss |
| ... | ... | ... |

FIG. 6

| SWAP STATION ID (901) | LOCATION (902) |
|---|---|
| ST00200020110008010 | lat-dd.mm.ss.sss<br>lon-dd.mm.ss.sss |
| ST00200020110008030 | lat-dd.mm.ss.sss<br>lon-dd.mm.ss.sss |
| ... | ... |

FIG. 12

| CHARGE COUNT | POINTS |
|---|---|
| 0 – 100 | 1 |
| 101 – 200 | 0.9 |
| 201 – 500 | 0.85 |
| 501 – 1000 | 0.75 |
| 1001 – | 0.70 |
| ... | ... |

FIG. 13

| FAST CHARGE COUNT | POINTS |
|---|---|
| 0 – 20 | 1 |
| 21 – 40 | 0.9 |
| 41 – 100 | 0.85 |
| 101 – 200 | 0.75 |
| 201 – | 0.70 |
| ... | ... |

FIG. 14

| FULL CHARGE RATIO | POINTS |
|---|---|
| 100% – 95% | 1 |
| 94% – 90% | 0.9 |
| 89% – 85% | 0.85 |
| 84% – 80% | 0.75 |
| 79% – 75% | 0.70 |
| ... | ... |

FIG. 15

| LOW CHARGE COUNT | POINTS |
|---|---|
| 0 | 1 |
| 1 | 0.9 |
| 2 – 3 | 0.85 |
| 4 – 5 | 0.75 |
| 6 – | 0.70 |
| ... | ... |

FIG. 16

| HIGH TEMPERATURE PERIOD | POINTS |
|---|---|
| 0H | 1 |
| 1H – 10H | 0.9 |
| 11H – 50H | 0.85 |
| 51H – 100H | 0.75 |
| 101H – 200H | 0.70 |
| ... | ... |

FIG. 17

| AGE | POINTS |
|---|---|
| 0M – 2M | 1 |
| 3M – 10M | 0.9 |
| 11M – 20M | 0.85 |
| 21M – 30M | 0.75 |
| 31M – 50M | 0.70 |
| ... | ... |

INFORMATION OUTPUT METHOD, INFORMATION PRESENTATION DEVICE, AND INFORMATION OUTPUT SYSTEM

This application claims priority to Japanese Patent Application No. 2013-246559, filed on Nov. 28, 2013, the contents of which are hereby incorporated by reference.

BACKGROUND

1. Technical Field

The present invention relates to technology that outputs information about a secondary battery on board a vehicle, and more particularly, relates to an information output method, an information presentation device, and an information output system that outputs information useful during a battery swap.

2. Description of the Related Art

Recently, technology is being developed for recharging or swapping the secondary battery in a vehicle that includes an electric motor driven by the battery. Japanese Unexamined Patent Application Publication No. 2012-211903 discloses technology that provides relevant information to the user of a vehicle in order to enable fast swapping when the charge level of the battery in the vehicle becomes low.

The technology in Japanese Unexamined Patent Application Publication No. 2012-211903 is a technology that informs the user of a vehicle with a low battery charge level of information such as the location of a station that provides a battery swap service (hereinafter designated a "swap station") within range of the vehicle, and the number of charged batteries, and reserves a battery swap with the swap station.

SUMMARY

An information output method according to an aspect of the present disclosure is an information output method that outputs output information when swapping a secondary battery for powering a vehicle. The information output method includes comparing a rank related to performance of a first battery unit on board a vehicle to a rank related to performance of a second battery unit that is installable in the vehicle in place of the first battery unit, and outputting the output information according to a result of the comparison in the comparing step.

Note that these general or specific aspects may also be realized by a system, device, method, and computer program, and may also be realized by an arbitrary combination of a system, device, method, and computer program.

An information output method of the present disclosure is able to output information that is more useful for the user of a vehicle compared to the related art.

BRIEF DESCRIPTION OF THE DRAWINGS

FIG. 3 is a diagram illustrating an example of the structure and content of battery information;

FIG. 4 is a diagram illustrating an example of the structure and content of battery database (DB) information;

FIG. 5 is a diagram illustrating an example of the structure and content of vehicle database (DB) information;

FIG. 6 is a diagram illustrating an example of the structure and content of swap station database (DB) information;

FIG. 12 is a diagram illustrating an example of a charge count table used in the assessment of battery rank;

FIG. 13 is a diagram illustrating an example of a fast charge count table used in the assessment of battery rank;

FIG. 14 is a diagram illustrating an example of a full charge ratio table used in the assessment of battery rank;

FIG. 15 is a diagram illustrating an example of a low charge count table used in the assessment of battery rank;

FIG. 16 is a diagram illustrating an example of a high-temperature period table used in the assessment of battery rank;

FIG. 17 is a diagram illustrating an example of an age table used in the assessment of battery rank;

DETAILED DESCRIPTION

Figure 1:
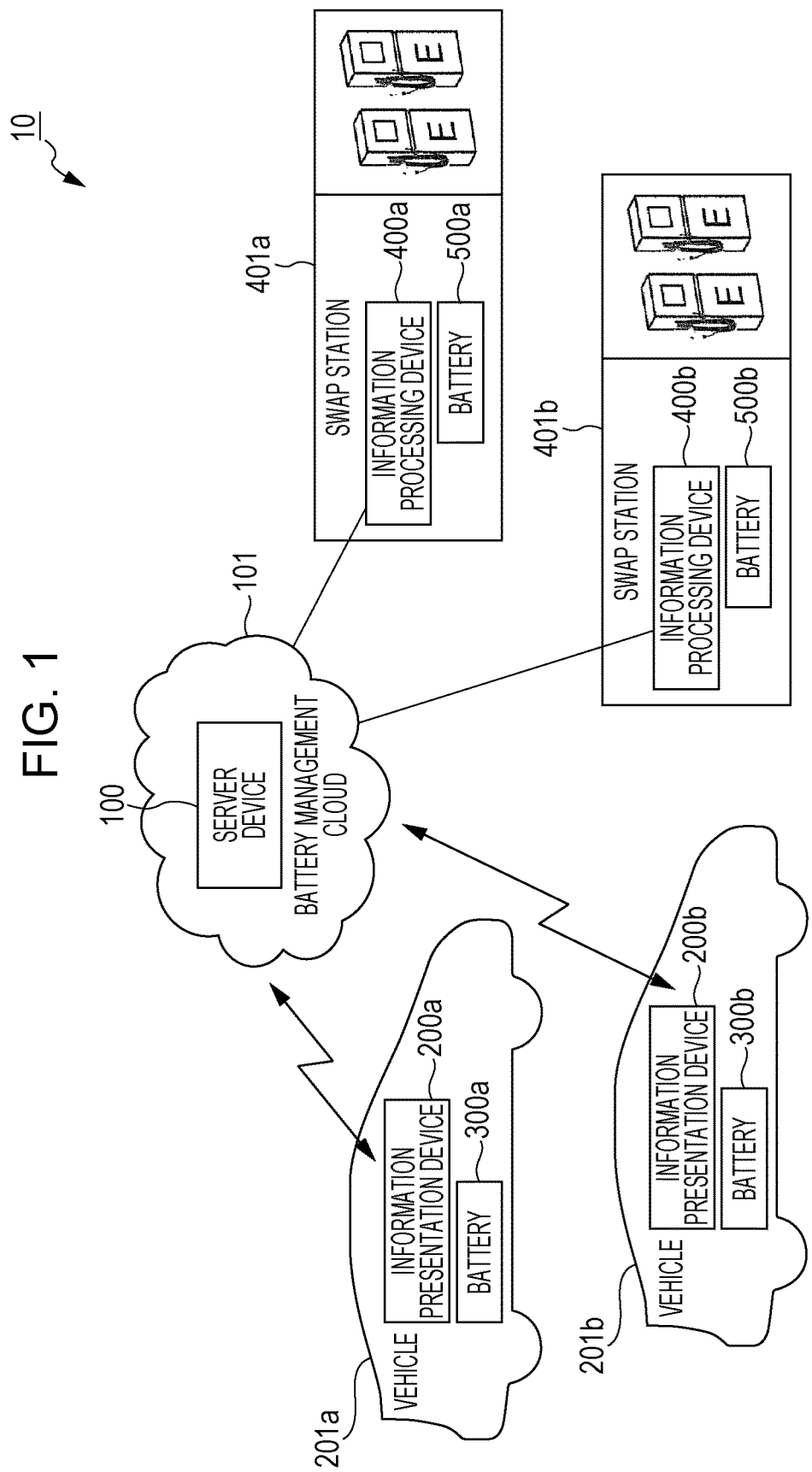
FIG. 1 is a schematic diagram illustrating an example of an information output system according to an embodiment of the present disclosure.

With the technology of Japanese Unexamined Patent Application Publication No. 2012-211903, the user of a vehicle is only able to obtain information relevant to fast battery swapping, such as the location of a swap station and the number of charged batteries at the swap station.

The present disclosure provides an information output method, an information presentation device, and an information output system that outputs information that is more useful for the user of a vehicle during a battery swap compared to the related art.

An information output method according to an aspect of the present disclosure is an information output method that outputs output information when swapping a secondary battery for powering a vehicle. The information output method includes comparing a rank related to performance of a first battery unit on board a vehicle to a rank related to performance of a second battery unit that is installable in the vehicle in place of the first battery unit, and outputting the output information according to a result of the comparison in the comparing step. Herein, "when swapping" refers to various periods related to swapping, such as a swap preparation period, or in other words the period leading up to swapping in a series of procedures performed with the intention of swapping, or a period of post-processing after swapping, such as a post-swap confirmation process.

Consequently, information reflecting a comparison result of rank related to the performance of the swapped battery units is output, and thus the user of the vehicle is able to obtain valuable information, for example. The user, by referencing the output information, becomes able to make a value judgment regarding swapping, for example.

The information output method according to an aspect of the present disclosure may additionally include: conducting a first assessment that acquires first history information recording phenomena that affect the performance of the first battery unit, and assessing the rank of the first battery unit on the basis of the first history information; and conducting a second assessment that acquires second history information recording phenomena that affect the performance of the second battery unit, and assessing the rank of the second battery unit on the basis of the second history information; wherein the comparison in the comparing step is executed by a processor as a comparison between the ranks assessed in the first assessing step and the second assessing step, and the output of output information in the outputting step is executed via the processor.

Consequently, the user of the vehicle becomes able to obtain information related to a comparison result regarding the changing performance of a battery unit that reflects the history of the battery unit, such as how the battery unit has been handled, for example.

Also, the information output method according to an aspect of the present disclosure may additionally include: conducting a first recording when charging the first battery unit that records the first history information that includes information indicating a charge count of the first battery unit; and conducting a second recording when charging the second battery unit that records the second history information that includes information indicating a charge count of the second battery unit; wherein the assessment of rank in the first assessing step assesses a rank as lower for a larger charge count of the first battery unit, and the assessment of rank in the second assessing step assesses a rank as lower for a larger charge count of the second battery unit.

Consequently, the user of the vehicle becomes able to obtain information reflecting a comparison result between battery units to be swapped from a perspective of performance that degrades due to charging the battery unit, for example. Consequently, when swapping a battery unit that has been charged many times and a battery unit that has only been charged a few times, the user becomes able to recognize that the swap is between battery units of different rank, for example.

Also, the information output method according to an aspect of the present disclosure may additionally include: conducting a first recording when fast-charging the first battery unit that records the first history information that includes information indicating a fast charge count of the first battery unit; and conducting a second recording when fast-charging the second battery unit that records the second history information that includes information indicating a fast charge count of the second battery unit; wherein the assessment of rank in the first assessing step assesses a rank as lower for a larger fast charge count of the first battery unit, and the assessment of rank in the second assessing step assesses a rank as lower for a larger fast charge count of the second battery unit.

Consequently, the user of the vehicle becomes able to obtain information reflecting a comparison result between battery units to be swapped from a perspective of performance that degrades due to fast-charging the battery unit, for example.

Also, the information output method according to an aspect of the present disclosure may additionally include: conducting a first recording when charging the first battery unit that records the first history information that includes information indicating a full charge ratio of the first battery unit; and conducting a second recording when charging the second battery unit that records the second history information that includes information indicating a full charge ratio of the second battery unit; wherein the assessment of rank in the first assessing step assesses a rank as higher for a higher full charge ratio of the first battery unit, and the assessment of rank in the second assessing step assesses a rank as higher for a higher full charge ratio of the second battery unit.

Consequently, the user of the vehicle becomes able to obtain information reflecting a comparison result between battery units to be swapped from a perspective of performance related to a full charge ratio of the battery unit, for example.

Also, the information output method according to an aspect of the present disclosure may be configured so that the first history information includes information indicating whether or not a charge ratio of the first battery unit has fallen below a prescribed threshold value, the second history information includes information indicating whether or not a charge ratio of the second battery unit has fallen below a prescribed threshold value, the assessment of rank in the first assessing step assesses a rank as lower if the charge ratio of the first battery unit has fallen below the prescribed threshold value than if the charge ratio of the first battery unit has not fallen below the prescribed threshold value, and the assessment of rank in the second assessing step assesses a rank as lower if the charge ratio of the second battery unit has fallen below the prescribed threshold value than if the charge ratio of the second battery unit has not fallen below the prescribed threshold value.

Consequently, the user of the vehicle becomes able to obtain information reflecting a comparison result between battery units to be swapped from a perspective of performance that degrades due to an over-discharged state of the battery unit, for example.

Also, the information output method according to an aspect of the present disclosure may be configured so that the first history information includes information indicating whether or not a temperature of the first battery unit has become equal to or greater than a prescribed temperature, the second history information includes information indicating whether or not a temperature of the second battery unit has become equal to or greater than a prescribed temperature, the assessment of rank in the first assessing step assesses a rank as lower if the temperature of the first battery unit has become equal to or greater than the prescribed temperature than if the temperature of the first battery unit has not become equal to or greater than the prescribed temperature, and the assessment of rank in the second assessing step assesses a rank as lower if the temperature of the second battery unit has become equal to or greater than the prescribed temperature than if the temperature of the first battery unit has not become equal to or greater than the prescribed temperature.

Consequently, the user of the vehicle becomes able to obtain information reflecting a comparison result between battery units to be swapped from a perspective of performance that degrades due to the battery unit being placed in a fixed temperature state, for example.

Also, the information output method according to an aspect of the present disclosure may be configured so that the first history information includes information indicating an elapsed time since manufacture of the first battery unit, the second history information includes information indicating an elapsed time since manufacture of the second battery unit, the assessment of rank in the first assessing step assesses a rank as lower for a longer elapsed time since manufacture of the first battery unit, and the assessment of rank in the second assessing step assesses a rank as lower for a longer elapsed time since manufacture of the second battery unit.

Consequently, the user of the vehicle becomes able to obtain information reflecting a comparison result between battery units to be swapped from a perspective of performance that degrades due to age, for example.

Also, the information output method according to an aspect of the present disclosure may be configured so that the rank of a battery unit is determined so that differences in the ranks of battery units express differences in discharge performance of battery units.

Consequently, information reflecting a comparison result of rank expressing differences in the discharge performance of the swapped battery units is output, and thus the user of the vehicle is able to obtain valuable information, for example. For example, with the output information, the user becomes able to take care not to swap in a battery unit with degraded discharge performance compared to the original battery unit.

Also, the information output method according to an aspect of the present disclosure may additionally include: conducting a first selection that selects one battery unit from among a plurality of battery units on board the vehicle as the first battery unit to be swapped; and conducting a second selection that selects, as the second battery unit, one battery unit from among battery units not on board the vehicle that is of the same type in terms of shape as the first battery unit selected by the first selecting step, wherein the comparison in the comparing step is executed between the rank of the first battery unit selected in the first selecting step and the rank of the second battery unit selected in the second selecting step.

Consequently, the object of battery rank comparison may be restricted to battery units having a swappable shape.

Also, the information output method according to an aspect of the present disclosure may additionally include: conducting a first selection that selects one battery unit from among a plurality of battery units on board the vehicle as the first battery unit to be swapped; and conducting a second selection that selects a plurality of battery units not on board the vehicle as the second battery unit, wherein the comparison in the comparing step is executed between the rank of the first battery unit selected in the first selecting step and the rank of each second battery unit selected in the second selecting step, the output information is information related to second battery units from among the second battery units selected in the second selecting step having a rank that is equal or higher than the rank of the first battery unit, and the output of output information in the outputting step is a presentation of the output information.

Consequently, the user of the vehicle becomes able to know swappable battery units that will not result in a rank lower than the original battery unit due to swapping, for example.

Also, in the information output method according to an aspect of the present disclosure, the output information may include information indicating the ranks of battery units from among the second battery units selected in the second selecting step having a rank that is equal or higher than the rank of the first battery unit, and identification information of the relevant battery units, and the presentation in the outputting step may be a display of the output information.

Consequently, the user of the vehicle becomes able to know the rank of swappable battery units that will not result in a rank lower than the original battery unit due to swapping, for example.

Also, in the information output method according to an aspect of the present disclosure, the output information may be information expressed in a format that distinguishes whether or not a second battery unit from among the second battery units selected in the second selecting step having a rank that is equal or higher than the rank of the first battery unit is of equal rank to the first battery unit.

Consequently, the user of the vehicle becomes able to know whether or not a battery unit that may be swapped in for an on-board battery unit is of the same rank as the on-board battery unit, for example.

Also, in the information output method according to an aspect of the present disclosure, the output information may additionally include information expressed in a format that distinguishes battery units from among the second battery units selected in the second selecting step having a rank that is lower than the rank of the first battery unit from battery units having a rank that is equal to or greater than the rank of the first battery unit.

Consequently, the user of the vehicle becomes able to know whether or not a battery unit that may be swapped in for an on-board battery unit is of a rank lower than the on-board battery unit, for example.

Also, the information output method according to an aspect of the present disclosure may additionally include: acquiring location information recording a location of each battery unit selected as the second battery unit in the second selecting step, wherein the output information indicates the location of each second battery unit having a rank equal to or higher than the rank of the first battery unit.

Consequently, the user of the vehicle becomes able to know the location (such as the location of a swap station) of a swappable battery unit that is of equal or higher rank compared to the on-board battery unit, for example.

Also, the information output method according to an aspect of the present disclosure may additionally include: conducting a first selection that selects two or more battery units from among a plurality of battery units on board the vehicle as the first battery unit to be swapped; and conducting a second selection that selects a plurality of battery units not on board the vehicle and distributed in a plurality of locations as the second battery unit, wherein the comparison in the comparing step is executed for each first battery unit selected in the first selecting step, between a rank related to performance of the first battery unit and a rank related to performance of each second battery unit selected in the second selecting step, and in the outputting step, for all first battery units selected in the first selecting step, if second battery units corresponding to ranks that are equal to or higher than the rank related to performance of the first battery units are located at the same location, information indicating the location is output as the output information.

Consequently, the user of the vehicle becomes able to know a place (such as the location of a swap station) having swappable battery units that are of equal or higher rank compared each on-board battery unit to be swapped, for example.

Also, the information output method according to an aspect of the present disclosure may additionally include: conducting a first specification that specifies, as the first battery unit, a battery unit that was on board the vehicle until a swap, but is no longer on board the vehicle because of the swap; and conducting a second specification that specifies, as the second battery unit, a battery unit that was not on board the vehicle until the swap, but was installed on board the vehicle because of the swap.

Consequently, after swapping battery units, information reflecting a comparison result of rank related to the performance of the swapped battery units, or in other words information useful for judging the value of the swap is output, and thus the user of the vehicle becomes able to recognize whether or not the swap was appropriate, for example.

Also, in the information output method according to an aspect of the present disclosure, in the outputting step, if the rank of the second battery unit is lower than the rank of the first battery unit, alert information may be output as the output information.

Consequently, the user of the vehicle becomes able to get an opportunity to confirm whether or not swapping an on-board battery unit was inappropriate, for example.

Also, in the information output method according to an aspect of the present disclosure, in the outputting step, if the rank of the second battery unit is equal to or higher than the rank of the first battery unit, information for reserving the swapping-in of the relevant second battery unit may be output as the output information.

Consequently, it becomes possible to make a reservation for the work of swapping an on-board battery unit for a battery unit of equal or higher rank.

Also, in the information output method according to an aspect of the present disclosure, the first history information includes at least one of pieces of information including a piece of information indicating a charge count of the first battery unit, a piece of information indicating a fast charge count of the first battery unit, a piece of information indicating a full charge ratio of the first battery unit, a piece of information indicating whether or not a charge ratio of the first battery unit has fallen below a prescribed threshold value, a piece of information indicating whether or not a temperature of the first battery unit has become equal to or greater than a prescribed temperature, and a piece of information indicating an elapsed time since manufacture of the first battery unit.

And the second history information includes at least one of pieces of information including a piece of information indicating a charge count of the second battery unit, a piece of information indicating a fast charge count of the second battery unit, a piece of information indicating a full charge ratio of the second battery unit, a piece of information indicating whether or not a charge ratio of the second battery unit has fallen below a prescribed threshold value, a piece of information indicating whether or not a temperature of the second battery unit has become equal to or greater than a prescribed temperature, and a piece of information indicating an elapsed time since manufacture of the second battery unit.

Also, an information output system according to an aspect of the present disclosure is an information output system that outputs output information when swapping a secondary battery for powering a vehicle, including: a first acquisition unit that acquires first history information recording phenomena that affect performance of a first battery unit on board the vehicle; a second acquisition unit that acquires second history information recording phenomena that affect performance of a second battery unit that is installable on board the vehicle in place of the first battery unit; a first assessment unit that assesses a rank related to the performance of the first battery unit on the basis of the first history information; a second assessment unit that assesses a rank related to the performance of the second battery unit on the basis of the second history information; a comparing unit that compares the rank of the first battery unit to the rank of the second battery unit; and an output unit that outputs the output information according to a result of the comparison by the comparing unit.

Consequently, information reflecting a comparison result of rank related to the performance of the swapped battery units is output, and thus the user of the vehicle is able to obtain valuable information, for example.

Also, an information presentation device according to an aspect of the present disclosure is an information presentation device, installed on board a vehicle, that presents presentation information when swapping a secondary battery for powering the vehicle, including: a storage medium storing history information recording phenomena that affect performance of a first battery unit on board the vehicle; a receiving unit that externally receives rank information indicating a rank related to performance of a second battery unit that is installable on board the vehicle in place of the first battery unit; a processor that assesses a rank related to performance of the first battery unit on the basis of the history information read out from the storage medium, that compares the rank related to performance of the first battery unit to a rank indicated by the rank information received by the receiving unit, and that generates and outputs the presentation information according to a comparison result; and a presentation unit that presents the presentation information output by the processor.

Consequently, information reflecting a comparison result of rank related to the performance of the swapped battery units is output in the vehicle, and thus the user of the vehicle is able to appropriately swap battery units on the basis of the information.

Also, the information presentation device according to an aspect of the present disclosure may be configured so that the processor reads out, from the storage medium, the history information related to the first battery unit on board the vehicle, and in the comparison, if the rank of the second battery unit is equal to or higher than the rank of the first battery unit, the processor generates the presentation information that includes the rank and identification information of the second battery unit in the presentation information, and that includes information indicating the assessed rank of the first battery unit in the presentation information.

Consequently, the user of the vehicle becomes able to know swappable battery units that will not result in a rank lower than the original battery unit due to swapping, and the ranks of the relevant battery units.

Also, the information presentation device according to an aspect of the present disclosure may be configured so that the receiving unit also externally receives information indicating a location of the second battery unit. The processor, after selecting one battery unit from among a plurality of battery units on board the vehicle as the first battery unit to be swapped, reads out the history information related to the relevant first battery unit, and the processor, if the rank of the second battery unit is equal to or higher than the rank of the first battery unit, generates and outputs the presentation information that includes a map indicating a route guiding the vehicle to the location of the second battery unit. The presentation unit displays the presentation information.

Consequently, the user of the vehicle becomes able to know a route to a place where it is possible to swap in a battery unit of equal or higher rank.

Note that these general or specific aspects also include combinations of one or a plurality of a device, system, method, integrated circuit, computer program, computer-readable recording medium, or the like.

Hereinafter, exemplary embodiments will be described with reference to the drawings.

The embodiments indicated herein all illustrate a preferred specific example of the present disclosure. Consequently, features such as numerical values, shapes, materials, structural elements, layout positions and connection states of structural elements, as well as steps and the ordering of steps indicated in the following embodiments are merely examples, and are not intended to limit the present disclosure. Among the structural elements in the following exemplary embodiments, structural elements that are not described in the independent claim indicating the broadest concept of the present disclosure are arbitrary or optional structural elements. Also, the drawings are diagrammatic views, and are not necessarily drawn strictly.

The respective embodiments primarily describe an information output method that uses an index called rank to compare the performance of respective battery units that may be swapped when swapping a battery unit on board a vehicle with a battery unit at a swap station, and then outputs information according to the comparison result.

Herein, a battery unit refers to all units of secondary batteries that may be used as a swappable unit, such as a battery cell, a battery module made up of a group of battery cells, or a battery pack made up of a group of battery modules. In addition, the performance of a battery unit is a concept distinct from the amount of charge (charge level) of a battery unit, and even battery units that have the same charge level may not have the same performance. The performance of a battery unit may be the discharge performance of the battery unit, for example. Note that although secondary batteries may be repeatedly charged and reused, secondary batteries have a finite lifespan. The discharge performance degrades over time due to wear, and the degree of degradation depends on factors such as usage patterns (such as charging) and/or storage temperature.

(Embodiment 1)

Hereinafter, Embodiment 1 according to the present disclosure will be described.

(Configuration)

FIG. 1 is a schematic diagram illustrating an example of an information output system 10 according to an embodiment of the present disclosure.

The information output system 10 is a system for outputting information useful to the user of a vehicle when swapping an on-board battery for a battery placed at a swap station, and realizes an information output method like the following. Generally, in the case of a battery swap, the method compares a rank corresponding to the performance of a swapped battery unit that was on board the vehicle to a rank corresponding to the performance of a battery unit placed at a swap station, and outputs output information (also called presentation information) according to the comparison result. Note that the concept of rank corresponding to the performance of a battery unit encompasses, for example, a rank for distinguishing differences in battery unit states in the case of focusing on one type of battery performance, such as discharge performance.

A swappable battery unit handled by the information output system 10 may be a battery unit or the like that is respectively mounted on board a large number of vehicles, and a battery unit that is placed at respective swap stations located in various places. FIG. 1 illustrates a representative example of two vehicles with on-board batteries (battery unit groups), and two swap stations where batteries (battery unit groups) are placed.

As illustrated in FIG. 1, the information output system 10 is equipped with information presentation devices 200a and 200b as well as batteries 300a and 300b mounted on board two vehicles 201a and 201b, respectively, information processing devices 400a and 400b as well as batteries 500a and 500b placed at two swap stations 401a and 401b, respectively, and a server device 100 provided in a battery management cloud 101.

Herein, the vehicles 201a and 201b are electric vehicles (EVs), each having a swappable secondary battery (for example, a lithium-ion battery) mounted on board, in which an electric motor causing the vehicle to travel may be driven by electric power from the secondary battery. When the charge level falls in the battery unit constituting the secondary battery on board a vehicle, the battery unit may be charged with an electric charger, or swapped for a battery unit (already charged) placed at a swap station.

The information presentation devices 200a and 200b and the information processing devices 400a and 400b are wirelessly connected to the battery management cloud 101 which is a network service such as the Internet (stationary parts may also be connected in a wired manner), and are able to communicate with the server device 100. Note that each device already stores information relevant to communication, such as the IP address of a communication peer. The information presentation devices 200a and 200b repeatedly transmit battery information, which indicates the charge level and the like of each battery unit on board the vehicle, and vehicle information, which indicates the current position and the like of the vehicle, to the server device 100. Also, the information processing devices 400a and 400b repeatedly transmit battery information, which indicates the charge level and the like of each battery unit placed at the swap station, to the server device 100.

The server device 100 acquires information for each battery unit in a vehicle or swap station. If the charge level of a battery unit in a vehicle is insufficient, the server device 100 generates swap information, which is information useful for battery swapping, and transmits the swap information to the information presentation device of that vehicle.

As a result, the user of the vehicle (such as the driver is able to obtain information (swap information) that is useful for battery swapping via the information presentation device. Although described in detail later, this swap information useful for battery swapping is an example of output information, and is information based on a comparison of rank corresponding to battery performance. For example, the swap information is information about a swap station storing a battery unit having a rank corresponding to battery performance that is equal to or greater than the battery unit to be swapped.

Such swap information derived from a comparison result of rank corresponding to battery performance helps prevent drops in the rating of the battery on board the vehicle due to swapping (that is, swapping in a battery unit that is more degraded than the battery unit before the swap). Also, when swapping a portion of battery units in the case in which multiple battery units are mounted on board a vehicle, swap information helps to efficiently use all battery units by keeping the respective battery units on board the vehicle to a rank within a fixed range.

Figure 2:
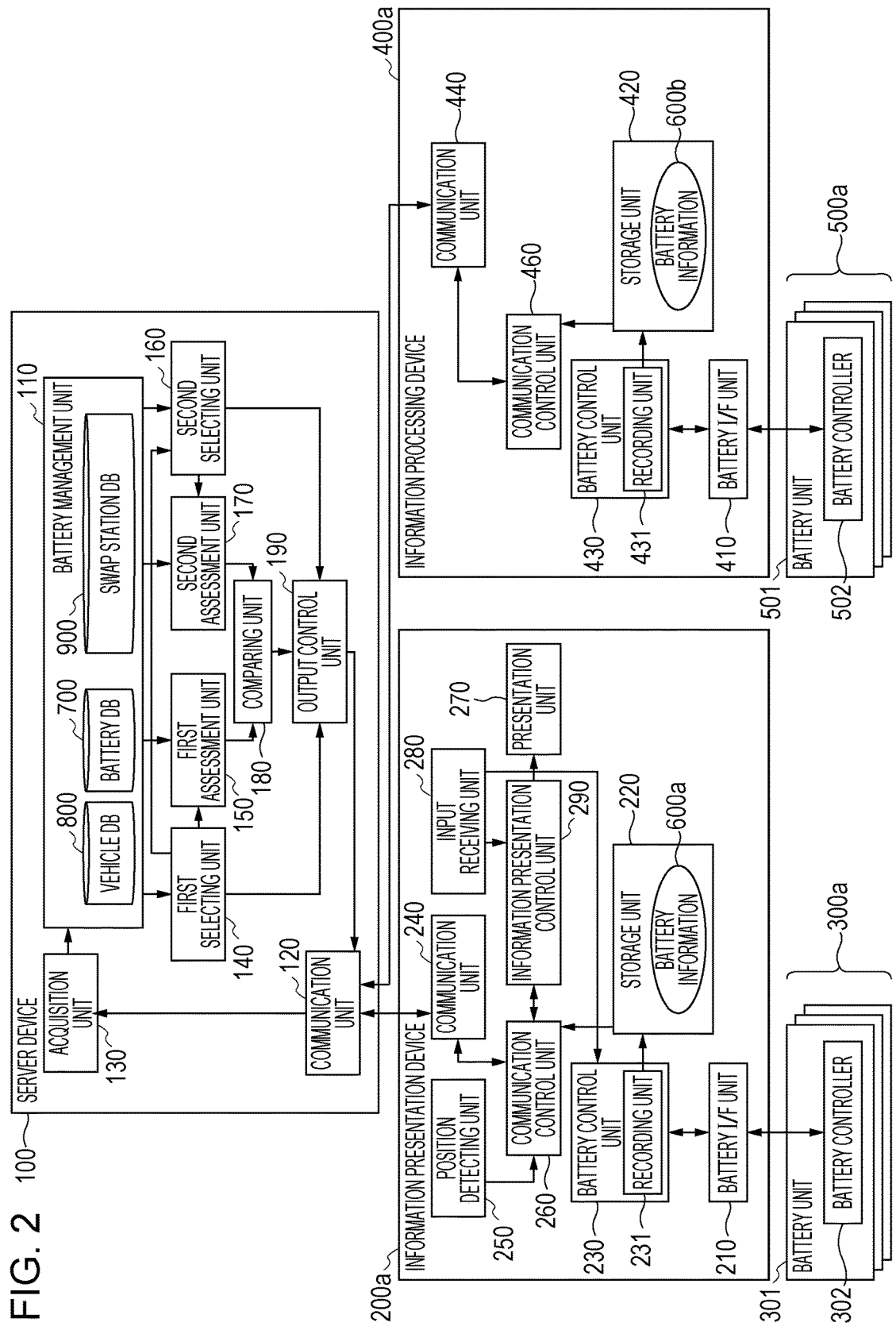
FIG. 2 is a block diagram illustrating an example of a functional configuration of respective device types in an information output system according to an embodiment of the present disclosure.

FIG. 2 is a block diagram illustrating an example of a functional configuration of respective device types in the information output system 10. FIG. 2 illustrates only the server device 100, the information presentation device 200a, the battery 300a, the information processing device 400a, and the battery 500a, whereas other device types are omitted.

Herein, the server device 100 is realized by a computer equipped with components such as memory, a processor, and a communication circuit. As illustrated in FIG. 2, functionally, the server device 100 includes a battery management unit 110, a communication unit 120, an acquisition unit 130, a first selecting unit 140, a first assessment unit 150, a second selecting unit 160, a second assessment unit 170, a comparing unit 180, and an output control unit 190. Additionally, the server device 100 executes a swap information output process (discussed later) for outputting swap information to be presented on an information presentation device.

The battery management unit 110 is responsible for the function of successively acquiring and storing information about each battery unit on board each vehicle and each battery unit placed at each swap station, and holds various data in a storage medium such as memory or a hard disk. Namely, the battery management unit 110 includes a battery database (DB) 700, a vehicle DB 800, and a swap station DB 900 to be discussed later.

The communication unit 120 includes a communication circuit, and includes a function of communicating with the information presentation device 200a and the information processing device 400a. This communication includes receiving battery information, vehicle position information, and the like from the information presentation device 200a, receiving battery information from the information processing device 400a, and transmitting swap information to the information presentation device 200a. Note that vehicle position information is information indicating the current position of a vehicle as well as the position of a destination to where the vehicle will travel in the future.

The acquisition unit 130 includes a function of acquiring battery information and vehicle position information received by the communication unit 120, and transmitting the acquired information to the battery management unit 110, thereby updating the battery DB 700 and the vehicle DB 800.

The first selecting unit 140 includes a function in which, if a battery unit to be charged (swapped) exists among the battery units on board a vehicle, the first selecting unit 140 selects the one or multiple battery units to be charged (swapped). In order to realize this function, the first selecting unit 140 executes a swap battery selection process (discussed later) by referencing the battery DB 700 held in the battery management unit 110.

The first assessment unit 150 includes a function of executing a battery rank assessment process (discussed later) on each battery unit selected by the first selecting unit 140, and thereby assessing the current rank (a rank corresponding to battery unit performance) for each battery unit to be swapped.

The second selecting unit 160 includes a function of referencing the battery DB 700, the vehicle DB 800, and the swap station DB 900 held in the battery management unit 110, and from among the battery units placed at swap stations within range of the vehicle carrying a battery unit selected by the first selecting unit 140, selecting a battery unit of the same type (also called the same model) as the battery unit selected by the first selecting unit 140. Herein, type is a fixed parameter stipulated in order to maintain the ability to swap between battery units for powering vehicles. The "same type" may refer to the shape being the same, for example, or factors such as the size or average output voltage being the same, for example.

The second assessment unit 170 includes a function of assessing the current rank (a rank corresponding to battery unit performance) for each swap candidate battery unit placed at a swap station. In order to realize this function, the second assessment unit 170 executes the battery rank assessment process discussed later on each battery unit selected by the second selecting unit 160.

The comparing unit 180 includes a function of comparing the rank assessed by the first assessment unit 150 for a battery unit to be swapped to the rank assessed by the second assessment unit 170 for a candidate battery unit to be swapped in, and reports the comparison result to the output control unit 190.

The output control unit 190 includes a function of generating and causing the communication unit 120 to transmit swap information related to the swapping of a battery to be swapped, according to the comparison result for each battery unit selected by the first selecting unit 140 and each battery unit selected by the second selecting unit 160. The recipient of this swap information is the information presentation device of the vehicle carrying a battery unit to be charged (swapped).

Note that the respective functions of the acquisition unit 130, the first selecting unit 140, the first assessment unit 150, the second selecting unit 160, the second assessment unit 170, the comparing unit 180, and the output control unit 190 are realized by a processor executing a control program stored in memory included in the server device 100.

In addition, the battery 300a on board the vehicle 201a is made up of multiple battery units 301, and each battery unit 301 includes a battery controller 302 that monitors the battery status, such as the temperature and voltage of the battery.

Also, the information presentation device 200a on board the vehicle 201a is a car navigation device of the related art (a device that presents a route from the current position of the vehicle to a destination), with additional functions such as a function of presenting information related to battery status and battery swapping. In terms of hardware, the information presentation device 200a is made up of a computer that includes a display device such as a liquid crystal display (LCD), an input device such as a touchpad, a computer equipped with components such as memory, a processor, and a communication circuit, a Global Positioning System (GPS) receiver, and a battery interface (I/F) unit 210. As illustrated in FIG. 2, functionally, the information presentation device 200a includes a battery I/F unit 210, a storage unit 220, a battery control unit 230, a communication unit 240, a position detecting unit 250, a communication control unit 260, a presentation unit 270, an input receiving unit 280, and an information presentation control unit 290.

The battery I/F unit 210 is an interface that connects the information presentation device 200a to each battery unit 301 constituting the battery 300a, and includes a function of enabling communication with the battery controller 302 of each battery unit 301.

The storage unit 220 is a storage medium such as memory for storing battery information 600a, which is information indicating the battery status.

The battery control unit 230 includes a recording unit 231, and is responsible for the following respective functions by executing a battery control process (discussed later). Namely, according to a specific user operation received by the input receiving unit 280, the battery control unit 230 is responsible for a function of controlling the charging of a battery unit 301 connected via the battery I/F unit 210. In addition, with the recording unit 231, the battery control unit 230 is responsible for a function of acquiring various information indicating the battery status from the battery controller 302 when charging or at fixed time intervals, and recording battery information 600a in the storage unit 220.

Note that charging is conducted by connecting the vehicle 201a to a charger, so that electric power supplied from the charger is supplied to a battery unit 301 through a switch controlled by the battery control unit 230. For the charger, a normal charger which is provided in a typical home or the like and which conducts normal charging may be used, or alternatively, a fast charger which is provided at a facility such as a charging station and which is capable of normal charging and fast charging may be used. Note that normal charging refers to charging using a constant current, constant voltage method. For example, charging is conducted using a single-phase 100 V or 200 V alternating current power source (with a rating of 20 A, for example). Meanwhile, fast charging refers to charging up to 80% of the battery capacity in a short time (for example, 30 minutes) with a three-phase 200 V power supply at a facility able to obtain a large of amount of power such as 50 kW (with a rating of 150 A, for example). When charging a battery unit 301, the battery control unit 230 selectively conducts fast charging or normal charging on the basis of the type of charger connected to the vehicle 201a, a selection operation by the user, or a predetermined selection algorithm.

The communication unit 240 includes a communication circuit, and includes a function of communicating with the server device 100.

The position detecting unit 250 includes a GPS receiver, and includes a function of acquiring the current position of the vehicle 201a.

The communication control unit 260 includes a function of attaching a vehicle ID (identification information for the vehicle 201a) set in advance via the input receiving unit 280 or the like to the battery information 600a stored in the storage unit 220, and transmitting the result to the server device 100 via the communication unit 240. In addition, the communication control unit 260 includes a function of generating vehicle position information from the current position of the vehicle 201a acquired by the position detecting unit 250 and the destination of the vehicle 201a input by a user (such as the driver) via the input receiving unit 280, and transmitting the vehicle position information to the server device 100. Additionally, the communication control unit 260 includes a function of receiving swap information from the server device 100 and transmitting the swap information to the information presentation control unit 290.

The presentation unit 270 includes a display device that presents information to the user by presenting a display, as well as an audio output device that presents information to the user by outputting audio.

The input receiving unit 280 includes an input device such as a touchpad, and includes a function of receiving information or instructions input by the user, and transmitting the received information and instructions to the information presentation control unit 290 and the battery control unit 230.

The information presentation control unit 290 includes a function of acquiring swap station from the server device 100, deciding content to display on-screen and content to output as audio on the basis of the swap information, and controlling the presentation unit 270 to present the display and output the audio. In addition, the information presentation control unit 290 also includes a function of displaying or outputting audio of the battery status on the basis of the battery information 600a.

Note that the respective functions of the battery control unit 230, the communication control unit 260, and the information presentation control unit 290 are realized by a processor executing a control program stored in memory included in the information presentation device 200a.

In addition, the battery 500a placed at the swap station 401a is made up of multiple battery units 501, and each battery unit 501 includes a battery controller 502 that monitors the battery status, such as the temperature and voltage of the battery.

Also, the information processing device 400a installed in the swap station 401a includes a function of transmitting the status of batteries placed at the swap station 401a to the server device 100. The information processing device 400a is realized by a computer equipped with components such as memory, a processor, and a communication circuit. As illustrated in FIG. 2, functionally, the information processing device 400a includes a battery I/F unit 410, a storage unit 420, a battery control unit 430, a communication unit 440, and a communication control unit 460.

The battery I/F unit 410 is an interface that connects the information processing device 400a to each battery unit 501 constituting the battery 500a, and includes a function of enabling communication with the battery controller 502 of each battery unit 501.

The storage unit 420 is a storage medium such as memory for storing battery information 600b, which is information indicating the battery status.

The battery control unit 430 includes a recording unit 431, and is responsible for the following respective functions by executing a battery control process (discussed later). Namely, the battery control unit 430 is responsible for a function of controlling the charging of a battery unit 501 connected via the battery I/F unit 410. In addition, with the recording unit 431, the battery control unit 230 is responsible for a function of acquiring various information indicating the battery status from the battery controller 502 when charging or at fixed time intervals, and recording battery information 600b in the storage unit 420. Note that when charging a battery unit 501, the battery control unit 430 selectively conducts fast charging or normal charging using a charger provided at the swap station 401a.

The communication unit 440 includes a communication circuit, and includes a function of communicating with the server device 100.

The communication control unit 460 includes a function of attaching a preset swap station ID (identification information for the swap station 401a) to the battery information 600b stored in the storage unit 420, and transmitting the result to the server device 100 via the communication unit 440.

Note that the respective functions of the battery control unit 430 and the communication control unit 460 are realized by a processor executing a control program stored in memory included in the information processing device 400a.

Also, although not illustrated in FIG. 2, the battery 300b and the information presentation device 200b on board the vehicle 201b include configurations similar to the battery 300a and the information presentation device 200a on board the vehicle 201a, respectively. Also, the battery 500b and the information processing device 400b at the swap station 401b includes configurations similar to the battery 500a and the information processing device 400a at the swap station 401a, respectively.

(Data Structure)

Hereinafter, data handled by the information output system 10 equipped with the above configuration (battery information, a battery DB, a vehicle DB, and a swap station DB) will be described.

FIG. 3 is a diagram illustrating an example of the structure and content of the battery information 600a.

The battery information 600a is stored in the storage unit 220 by the recording unit 231 of the information presentation device 200a on board the vehicle 201a, and is transmitted to the server device 100.

As illustrated in FIG. 3, the battery information 600a includes a battery unit ID 601, a layout 602, a charge level 603, and history information 610 for each of the multiple battery units 301 on board the vehicle 201a.

Herein, the battery unit ID 601 for a battery unit 301 is information that identifies the battery unit 301, while the layout 602 is information indicating the position of the battery unit 301 inside the vehicle 201a (such as which row and which column). The charge level 603 is information indicating the charge level (relative capacity ratio) of the battery unit 301.

Also, in the history information 610 for a battery unit 301, phenomena that affect the performance of the battery unit 301 are recorded, for example. The history information 610 includes a charge count 611, a fast charge count 612, a full charge ratio 613, a low charge count 614, a high temperature period 615, and an age 616, for example.

The charge count 611 for a battery unit 301 indicates the number of times that the battery unit 301 has been charged up to the present time. This count is increased by 1 by the recording unit 231 every time the battery control unit 230 conducts charging. The fast charge count 612 for a battery unit 301 indicates the number of times that the battery unit 301 has been fast-charged up to the present time. This count is increased by 1 by the recording unit 231 every time the battery control unit 230 conducts fast charging. The full charge ratio 613 for a battery unit 301 is information indicating the charge level (relative capacity ratio) when the battery unit 301 was last fully charged up to the present time, and is recorded by the recording unit 231 on the basis of a voltage change measured by the battery controller 302. The low charge count 614 for a battery unit 301 indicates the number of times that the charge ratio has fallen below a predetermined threshold value (for example, 10% of the capacity) due to discharging of the battery unit 301, and is recorded by the recording unit 231 on the basis of a voltage change measured by the battery controller 302. The high temperature period 615 for a battery unit 301 is information indicating a period of time during which the battery unit 301 was at or above a predetermined temperature (for example, at or above 60 degrees Celsius), and is recorded by the recording unit 231 on the basis of a temperature measured by the battery controller 302. The age 616 for a battery unit 301 indicates the period of time that has elapsed from manufacture up to the present time, and is recorded by the recording unit 231 on the basis of the difference between the current date/time and the manufacture date/time held in the battery controller 302 in advance.

The exemplary content in FIG. 3 indicates that a battery unit with the battery unit ID "PBRX220-201310012222" is laid out in the third row and third column of a battery unit group inside a vehicle, and that the current charge level is 20% of the capacity. In addition, the battery information indicates that the relevant battery unit has been charged ten times up to the present time and has never been fast-charged, the full charge ratio is 99%, the low charge count is zero, the battery unit has never been placed in a high-temperature environment that equals or exceeds the predetermined temperature, and one month (1M) has elapsed since manufacture.

Note that the battery information 600b which is stored in the storage unit 420 by the recording unit 431 of the information processing device 400a installed at the swap station 401a, and transmitted to the server device 100, includes a structure similar to the battery information 600a. Also, battery information having a similar structure is also transmitted to the server device from the information presentation device 200b and the information processing device 400b. Note that the information processing device 400a applies control to conduct charging if the charge ratio falls below a threshold value (for example, 30% of the capacity) for each battery unit placed at the swap station 401a, and updates the battery information 600b when controlling charging, for example. In other words, the recording unit 431 of the information processing device 400a also records information such as the charge count and the fast charge count, similarly to the recording unit 231 of the information presentation device 200a.

FIG. 4 is a diagram illustrating an example of the structure and content of information stored in the battery DB 700 (battery DB information).

The battery DB information is information in the server device 100 that is an integration of battery information transmitted from each information presentation device and each information processing device, and includes various information for each battery unit. Namely, the battery DB information includes, for each battery unit, a battery unit ID 701, a type 702, a location category 703, a location ID 704, a layout 705, a charge level 706, and history information 710. The history information 710 includes a charge count 711, a fast charge count 712, a full charge ratio 713, a low charge count 714, a high temperature period 715, and an age 716.

Herein, each of the battery unit ID 701, the layout 705, the charge level 706, the charge count 711, the fast charge count 712, the full charge ratio 713, the low charge count 714, the high temperature period 715, and the age 716 are copied from the content of the battery information discussed earlier (see FIG. 3). The type 702 for a battery unit indicates a type corresponding to features such as the shape, size, and average output voltage of the battery unit. The location category 703 for a battery unit indicates whether the battery unit is currently in a vehicle or a swap station, while the location ID 704 indicates identification information for that vehicle or swap station.

The exemplary content in FIG. 4 indicates that a battery unit with the battery unit ID "CV333-201108ZYXRB3" is of a type "T2", and is located at a swap station identified as "ST00200020110008010". The battery DB information also indicates that the relevant battery unit is laid out in the 151st row and 24th column inside the swap station, the current charge level is 91%, the battery unit has been charged 90 times and fast-charged 10 times, and the full charge ratio is 98%. The battery DB information also indicates that for the relevant battery unit, the low charge count is 0, the time that the battery unit has been placed in a high-temperature environment at or above the predetermined temperature is 0 hours (0 H), and two months (2 M) have elapsed since manufacture.

FIG. 5 is a diagram illustrating an example of the structure and content of information stored in the vehicle DB 800 (vehicle DB information).

The vehicle DB information is information in the server device 100 that is an integration of vehicle position information transmitted from each information presentation device, and includes information about each vehicle. Namely, the vehicle DB information includes a vehicle ID 801, a current position 802, and a destination 803 for each vehicle.

Herein, the vehicle ID 801 for a vehicle indicates identification information for that vehicle, the current position 802 indicates the current position (latitude and longitude) of the vehicle, and the destination 803 indicates the destination (latitude and longitude) of the vehicle.

FIG. 6 is a diagram illustrating an example of the structure and content of information stored in the swap station DB 900 (swap station DB information).

The swap station DB information includes a swap station ID 901 as identification information for a swap station, and a location 902 indicating the position (latitude and longitude) of that swap station. The swap station DB information is updated when a new swap station is established.

Note that the location 902 is used in the server device 100 in order to search for swap stations located at positions along the route from the current position to the destination of a vehicle carrying a battery unit to be charged (swapped), or swap stations existing near the route and within range of the vehicle.

(Operations)

Hereinafter, operations of each device type in the information output system 10 equipped with the configurations discussed above and handling the information (data) discussed above will be described.

Figure 7:
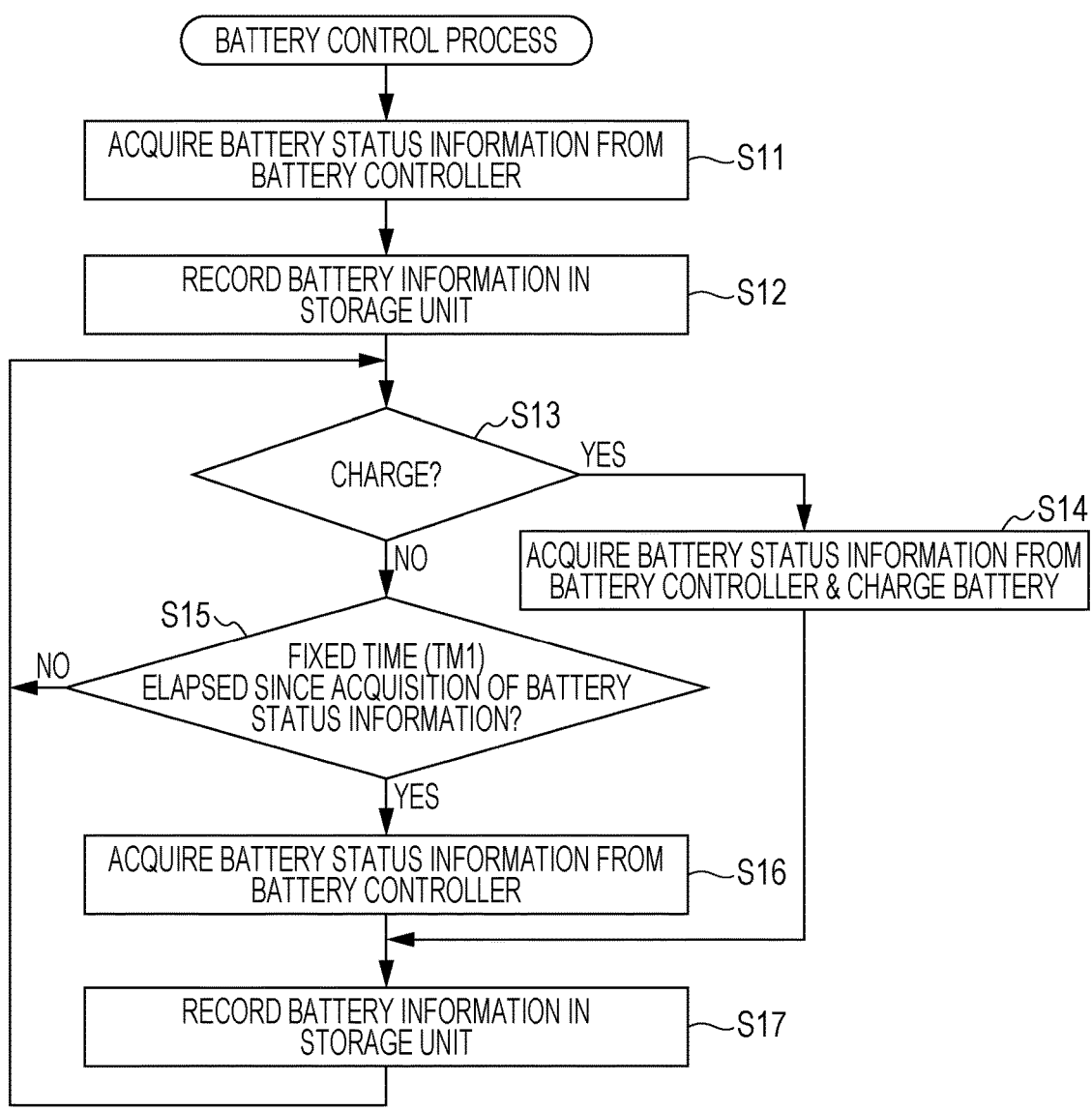
FIG. 7 is a flowchart illustrating an example of a battery control process.

FIG. 7 is a flowchart illustrating an example of a battery control process. The battery control process is executed by the battery control unit in each information presentation device and the battery control unit in each information processing device. The following primarily describes the battery control unit 230 of the information presentation device 200a as an example.

The battery control unit 230 of the information presentation device 200a on board the vehicle 201a acquires a battery unit ID and information related to the battery status (such as the temperature and voltage) from the battery controller 302 of a battery unit 301 on board the vehicle 201a (step S11). On the basis of the acquired information, the recording unit 231 records battery information 600a in the storage unit 220 (step S12). Note that the battery control unit 230 may acquire information such as the battery unit ID in a fixed order with respect to each battery unit laid out in a grid pattern, and thereby specify the layout 602 in the battery information 600a on the basis of that order.

Next, in the case of charging (step S13), the battery control unit 230 starts charging by controlling a switch so that electric power from the charger connected to the vehicle is supplied to a battery unit 301 via the battery I/F unit 210 (step S14). Note that in the judgment of whether or not to charge (step S13), if the judging agent is the battery control unit of the information presentation device, it is judged that charging will be conducted if the input receiving unit 280 receives a user operation for conducting charging, for example. Also, if the judging agent is the battery control unit of the information processing device, information related to battery status is acquired from the battery controller of each battery unit, and from this information it is judged that charging will be conducted if the voltage falls to or below a fixed value, for example. Subsequently, information related to battery status is acquired from the battery controller 302, and charging is controlled according to voltage and current changes while measuring the current flowing to the battery unit. Charging is ended in the case of determining, as a result of the amount of current flowing to the battery unit falling to or below a fixed reference value, that full charge has been reached. The full charge ratio is specified, and the battery information 600a in the storage unit 220 is updated. Additionally, the battery information 600a in the information presentation device 200 is updated so that the charge count is incremented by 1, and if a fast charge, the fast charge count is incremented by 1 (step S17). Also, even in the case of not receiving an operation for conducting charging, every time a fixed time elapses (step S15), information related to battery status is acquired from the battery controller 302 (step S16), and the battery information 600a is updated on the basis of this information (step S17).

According to such a battery control process, battery information inside the storage unit in each information presentation device and each information processing device is continually updated.

Figure 8:
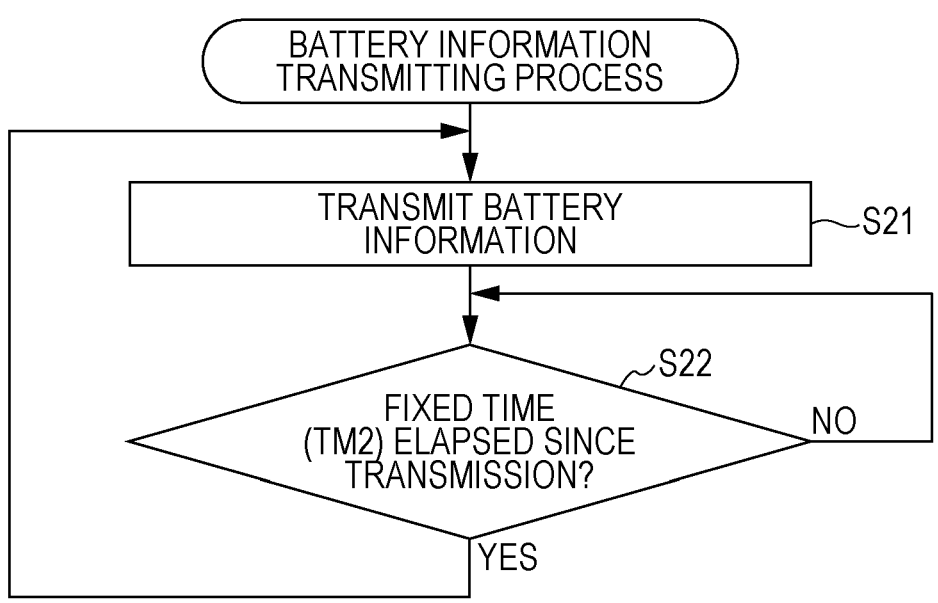
FIG. 8 is a flowchart illustrating an example of a battery information transmitting process.

FIG. 8 is a flowchart illustrating an example of a battery information transmitting process.

Battery information inside the storage unit in each information presentation device and each information processing device that is continually updated by the above battery control process is transmitted to the server device 100 according to the battery information transmitting process illustrated in FIG. 8. In the case of the information presentation device 200a, the communication control unit 260 acquires the battery information 600a in the storage unit 220, and transmits the battery information 600a to the server device 100 via the communication unit 240 (step S21). In addition, the acquisition and transmission of the continually updated battery information 600a is repeated at a fixed time interval (step S22). Note that when transmitting battery information, each information presentation device adds vehicle position information for transmission to the server device 100.

As a result of this battery control process, the server device 100 acquires, via the communication unit 120 with the acquisition unit 130, battery information transmitted from each information presentation device and each information processing device, and vehicle position information transmitted from each information presentation device. Subsequently, the battery DB 700 and the vehicle DB 800 are updated by the acquisition unit 130 on the basis of the battery information and the vehicle position information.

Subsequently, the server device 100 references the battery DB 700, the vehicle DB 800, and the swap station DB 900 of the battery management unit 110, detects a battery unit to be charged (swapped) that is on board a vehicle, and outputs swap information to be presented on the information presentation device of that vehicle.

Figure 9:
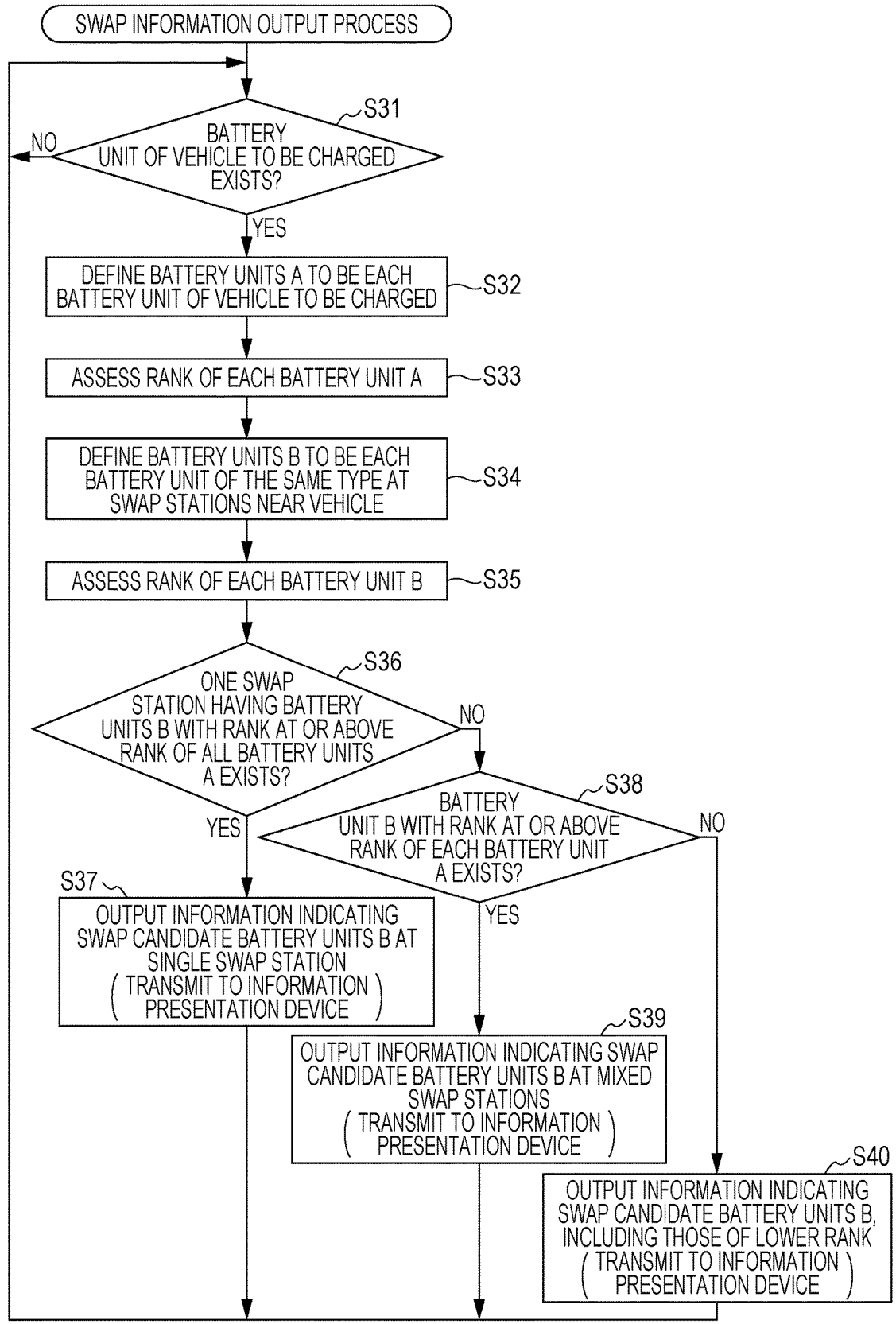
FIG. 9 is a flowchart illustrating an example of a swap information outputting process.

FIG. 9 is a flowchart illustrating an example of a swap information output process executed by the server device 100.

The server device 100 references the battery DB 700 of the battery management unit 110, and checks for an on-board battery unit to be charged (step S31). The check is repeated if no such battery unit exists. If an on-board battery unit to be charged exists, each on-board battery unit to be charged is defined to be a battery unit A to be swapped (step S32), and a rank corresponding to performance is assessed for each battery unit A (step S33).

A specific example of the operations thus far (step S31 to step S33) will be described using FIGS. 10 and 11.

Figure 10:
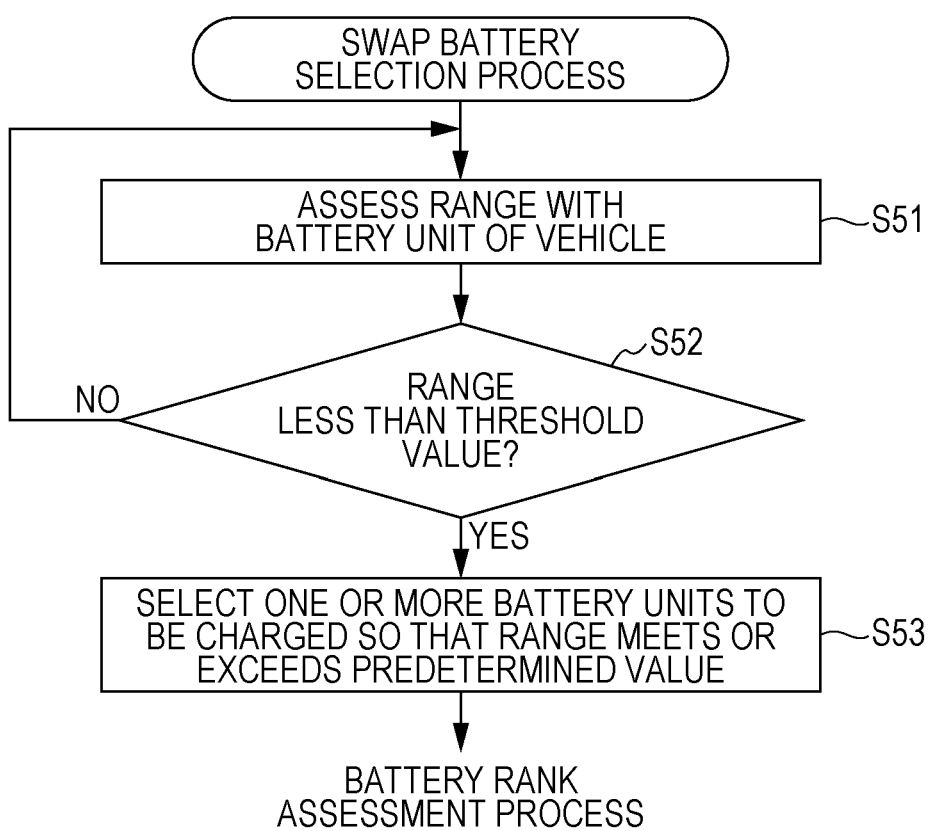
FIG. 10 is a flowchart illustrating an example of a swap battery selection process.
Figure 11:
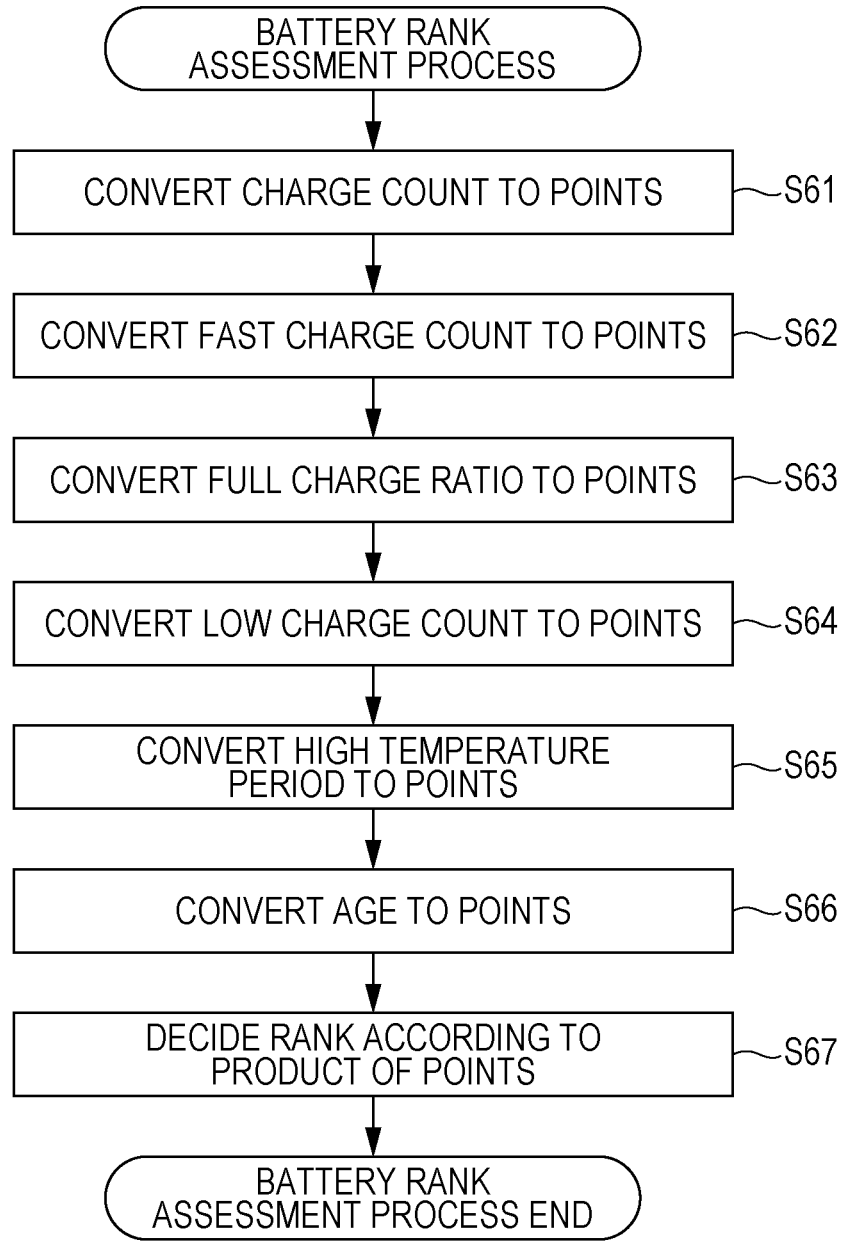
FIG. 11 is a flowchart illustrating an example of a battery rank assessment process.
Figure 18:
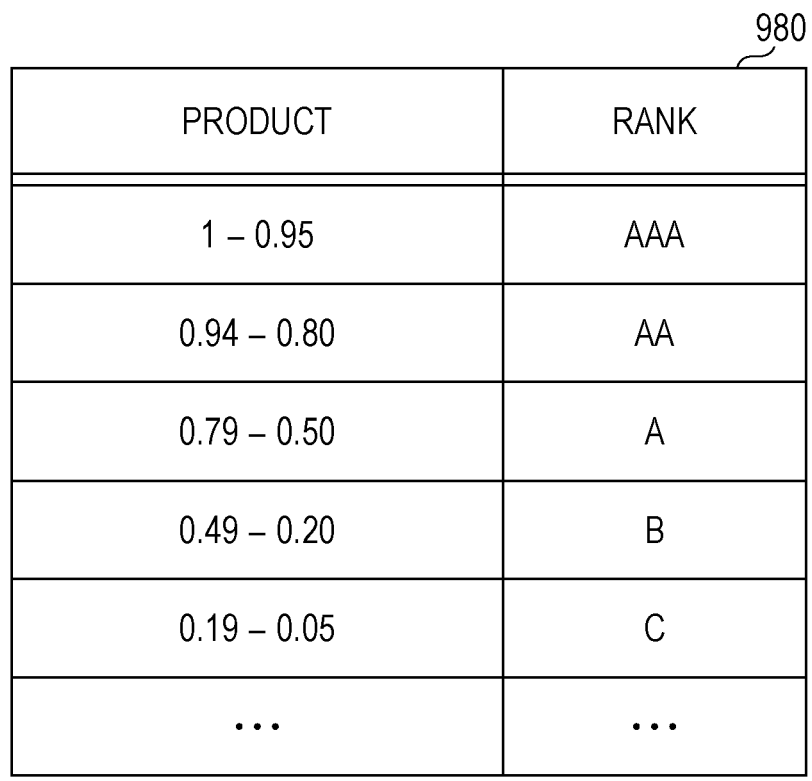
FIG. 18 is a diagram illustrating an example of a rank table used in the assessment of battery rank.

The first selecting unit 140 of the server device 100 conducts a swap battery selection process (see FIG. 10). In other words, the first selecting unit 140 references the location category 703, the location ID 704, and the charge level 706 of the battery DB information stored in the battery DB 700 of the battery management unit 110, and assesses the range of the vehicle from the charge level of each battery unit on board the same vehicle (step S51). This range assessment is conducted using information indicating a predetermined relationship between the battery charge level and range. If the assessed range is not less than a predetermined threshold value (for example, 25 km) (step S52), it is judged that no on-board battery unit is to be charged, and the process returns to step S51. On the other hand, if the assessed range is less than the predetermined threshold value (step S52), the first selecting unit 140 selects one or more battery units to be charged so that the range will become equal to or greater than a predetermined value (for example, 50 km) (step S53). This selection of one or more battery units to be charged is conducted by a sequence that selects battery units in order of lowest charge level 706, assumes that the battery unit is changed to an 80% charge state (that is, assumes that a battery unit at 80% charge is swapped in), and ends selection if the range becomes equal to or greater than the predetermined value as a result, for example.

After one or more battery units are selected by the first selecting unit 140, the first assessment unit 150 references the history information 710 of the battery DB information stored in the battery DB 700 of the battery management unit 110, and conducts a battery rank assessment process (see FIG. 11) for each selected battery unit.

FIGS. 12 to 18 are diagrams that respectively illustrate examples of a charge count table 920, a fast charge count table 930, a full charge ratio table 940, a low charge count table 950, a high temperature period table 960, an age table 970, and a rank table 980 used in the battery rank assessment process.

First, the first assessment unit 150 converts the charge count 711 of the battery DB information into points, on the basis of the charge count table 920 (see FIG. 12) (step S61). Next, the first assessment unit 150 converts the fast charge count 712 of the battery DB information into points, on the basis of the fast charge count table 930 (see FIG. 13) (step S62). Subsequently, the first assessment unit 150 converts the full charge ratio 713 of the battery DB information into points on the basis of the full charge ratio table 940 (see FIG. 14) (step S63), and converts the low charge count 714 into points on the basis of the low charge count table 950 (see FIG. 15) (step S64). Subsequently, the first assessment unit 150 converts the high temperature period 715 into points on the basis of the high temperature period table 960 (see FIG. 16) (step S65), and converts the age 716 into points on the basis of the age table 970 (see FIG. 17) (step S66). Finally, the first assessment unit 150 assesses a rank on the basis of the rank table 980 (see FIG. 18) from the result of multiplying all points converted in steps S61 to S66 (step S67).

For example, if the battery unit with the battery unit ID 701 of "PBRX220-201310012222" in FIG. 4 is selected as one of the battery units A to be swapped, conducting the battery rank assessment process for this battery unit A results in the following. Namely, the charge count 711 of 10 times (see FIG. 4) is converted into 1 point, the fast charge count 712 of 0 times is converted into 1 point, the full charge ratio 713 of 99% is converted into 1 point, the low charge count 714 of 0 times is converted into 1 point, the high temperature period 715 of 0 hours (0 H) is converted into 1 point, and the age 716 of 1 month (1 M) is converted into 1 point. Subsequently, since the multiplicative product of all converted points (1*1*1*1*1) is 1, this battery unit A is assessed at a rank of AAA (see FIG. 18). As another example, if the battery unit with the battery unit ID 701 of "PBRX220-201310012543" in FIG. 4 is also selected as one of the battery units A to be swapped, this battery unit A is similarly assessed at a rank of AAA.

Referring back to FIG. 9, the description of step S34 and thereafter will be resumed.

The second selecting unit 160 of the server device 100 defines as a battery unit B each battery unit of the same type at swap stations near the vehicle carrying a battery unit selected as a battery unit A to be swapped (step S34). Nearby swap stations are found in the following way by referencing the vehicle DB 800 and the swap station DB 900. Namely, the second selecting unit 160 searches for a swap station that is located on the route from the current position 802 to the destination 803 of the vehicle carrying a battery unit A or within a fixed range from the route (for example, a radius of 5 km), and in addition, is located at a place reachable with the remaining battery charge. The second selecting unit 160 references the type 702 in the battery DB information of the battery DB 700, and from among the battery units placed at each swap station found as a search result, selects as a battery unit B the battery units that are the same type as the battery unit A.

Subsequently, the second assessment unit 170 of the server device 100 conducts a battery rank assessment process similarly to the first assessment unit 150 discussed above (see FIG. 11) for each battery unit B selected by the second selecting unit 160 (step S35).

For example, if the battery unit with the battery unit ID 701 "CV333-201108ZYXRB3" in FIG. 4 is selected as one of the battery units B, conducting the battery rank assessment process for this battery unit B results in the following. Namely, the charge count 711 of 90 times (see FIG. 4) is converted into 1 point, the fast charge count 712 of 10 times is converted into 1 point, the full charge ratio 713 of 98% is converted into 1 point, the low charge count 714 of 0 times is converted into 1 point, the high temperature period 715 of 0 hours is converted into 1 point, and the age 716 of 2 months is converted into 1 point. Subsequently, since the multiplicative product of all converted points (1*1*1*1*1) is 1, the battery unit B is assessed at a rank of AAA (see FIG. 18).

As another example, if the battery unit with the battery unit ID 701 of "CV333-201108ZYABC4" in FIG. 4 is also selected as one of the battery units B, a rank assessment like the following is conducted according to the battery rank assessment process. Namely, the charge count 711 of 110 times (see FIG. 4) is converted into 0.9 points, the fast charge count 712 of 25 times is converted into 0.9 points, the full charge ratio 713 of 96% is converted into 1 point, the low charge count 714 of 1 time is converted into 0.9 points, the high temperature period 715 of 5 hours is converted into 0.9 points, and the age 716 of 9 months is converted into 0.9 points. Subsequently, since the multiplicative product of all converted points (0.9*0.9*1*0.9*0.9*0.9) is 0.59049, the battery unit B is assessed at a rank of A (see FIG. 18).

After the ranks of the battery units A and battery units B are assessed, the comparing unit 180 of the server device 100 compares the ranks of the battery units A and the battery units B, and makes the following judgment.

Namely, the comparing unit 180 judges whether or not one swap station having battery units B with a rank at or above the ranks of all battery units A exists (step S36). For the user of the vehicle, this judgment means whether or not the user is able to go to one swap station and swap in candidate battery units at the same or higher rank. When this judgment is described in terms of the example of the two battery units A discussed above (see FIG. 4), since the battery units A are both rank AAA, it is judged whether or not a swap station having two battery units B with a rank of AAA or better exists. In step S36, if the comparing unit 180 judges that a swap station having such battery units B exists, the output control unit 190 generates and outputs swap information which indicates the battery units B at that swap station (step S37). The swap information generated at this point includes information about the battery units A from the battery DB information illustrated in FIG. 4, information on the ranks assessed for the battery units A, information about the relevant battery units B, information on the ranks assessed for those battery units B, and information related to the swap station illustrated in FIG. 6 (such as location information).

Also, in the case of judging in step S36 that one swap station having battery units B with a rank at or above the ranks of all battery units A does not exist, it is judged whether or not such battery units B exist distributed among multiple swap stations (step S38). As a result of the judgment in step S38, if it is judged that such battery units B exist distributed among multiple swap stations, the output control unit 190 generates and outputs swap information which indicates the battery units B which exist distributed at swap stations (step S39). Also, in the judgment in step S38, if the number of battery units B, with a rank at or above the ranks of all battery units A, is less than the number of battery units A, the output control unit 190 generates and outputs swap information indicating battery units B, including battery units B of lower rank than the battery units A (step S40). Note that for the output of swap information (steps S37, S39, and S40), ultimately, swap information is transmitted via the communication unit 120 to the information presentation device of the vehicle carrying the battery units A.

As a result of such a swap information output process by the server device 100, the information presentation device of a vehicle carrying battery units to be charged (swapped) receives swap information.

Hereinafter, the receiving and utilization of swap information by the information presentation device will be described.

Herein, suppose that the battery units A to be charged (swapped) are the battery units in the third row, third column and in the third row, fourth column in the grid of a battery unit group on board the vehicle 201*a*. Also, suppose that one of the swap stations located near the vehicle 201*a* is the swap station 401*a* having the identification information "ST00200020110008010" (see FIG. 4). In addition, the following description supposes that the second selecting unit 160 has selected, as the battery units B, two battery units respectively having the battery unit ID 701 of "CV333-201108ZYXRB3" and "CV333-20110BZYABC4" illustrated in the specific example of FIG. 4. In this case, the two battery units A have a rank of AAA, but at the nearby swap station 401*a*, there is only one battery unit with a rank of AAA, and one battery unit with a rank of A.

In this case, swap information from the server device 100 (the information output in step S40) is transmitted to the information presentation device 200*a* of the vehicle 201*a*.

The communication control unit 260 of the information presentation device 200*a* receives and acquires the swap information via the communication unit 240, and transmits the swap information to the information presentation control unit 290. On the basis of the swap information, the information presentation control unit 290 generates and causes the presentation unit 270 to display a screen indicating the ranks of the battery units to be charged (swapped), and the ranks of battery units that may be swapped in at a swap station. Also, the information presentation control unit 290 causes the presentation unit 270 to output audio expressing the content of the screen. Consequently, a screen is displayed on the display device constituting the information presentation device 200*a*, and in addition, audio is output from an audio output device. The swap information may also be displayed on the screen in an arbitrary format. Although the swap information includes information about all battery units A and specific battery units A from the battery DB information, information on the ranks of the battery units A, information on the ranks of the battery units B, and information related to the swap station, a portion of this information may be displayed.

Figure 19:
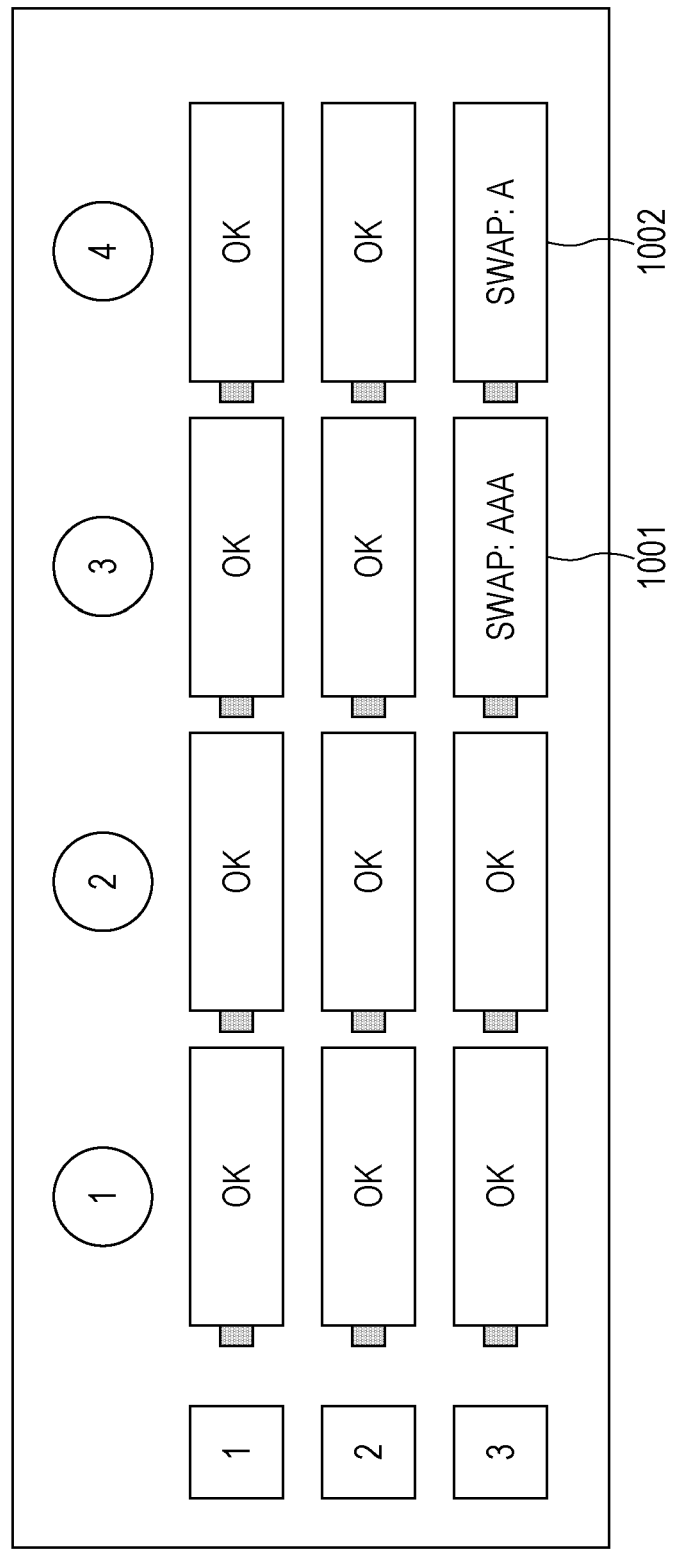
FIG. 19 is a diagram illustrating an example of a battery swap screen display (before battery swap)

FIG. 19 is a diagram illustrating an example of a screen displayed on a display device in the information presentation device 200*a*. On the example screen illustrated in FIG. 19, a battery mark 1001 and a battery mark 1002 indicate that the battery units in the third row, third column and third row, fourth column are to be charged (swapped). Also, supposing that the battery units are swapped for the battery units placed at the nearby swap station, the example screen indicates that one battery unit has a rank of AAA, while the other battery unit has a rank of A.

According to a screen and the like output by the presentation unit 270 of the information presentation device 200*a* in this way, the user of the vehicle becomes able to obtain information related to a comparison result of a rank corresponding to battery performance when swapping batteries (information related to battery unit swapping). Note that if the user confirms the information related to battery unit swapping via the display device and the like of the information presentation device 200*a*, and provides specific input indicating confirmation, for example, the information presentation device 200*a* may transmit information for reserving a battery swap at the swap station. This reservation information may be relayed to an information processing device or the like installed at the swap station via the server device 100, for example. Also, if the user provides specific input, the information presentation device 200*a* may also display a map indicating a route guiding the vehicle from the current position to the swap station on the display device, and output guidance messages from the audio output device.

(Embodiment 2)

Hereinafter, Embodiment 2 according to the present disclosure will be described.

In the information output system according to Embodiment 2, from among the device types constituting the information output system 10 according to Embodiment 1 (see FIG. 1), the server device 100 is partially modified and the information presentation device 200*a* and the information presentation device 200*b* are also partially modified. Namely, part of the functional configuration included in the server device 100 is transferred to the information presentation device. Herein, the same signs as Embodiment 1 are used for elements similar to Embodiment 1, and the description of items similar to items indicated in Embodiment 1 will be reduced or omitted as appropriate.

The following primarily describes an information presentation device 1200 (a partial modification of the information presentation device 200a in Embodiment 1) on board the vehicle 201a, and a server device 1100 (a partial modification of the server device 100 in Embodiment 1). Note that an information presentation device similar to the information presentation device 1200 is also installed on board the vehicle 201b.

In Embodiment 1, the server device 100 is responsible for the function of selecting and assessing the rank of an on-board battery unit to be charged (swapped), as well as the function of comparing ranks between battery units, but in the present embodiment, these functions are moved to the information presentation device 1200.

(Configuration)

Figure 20:
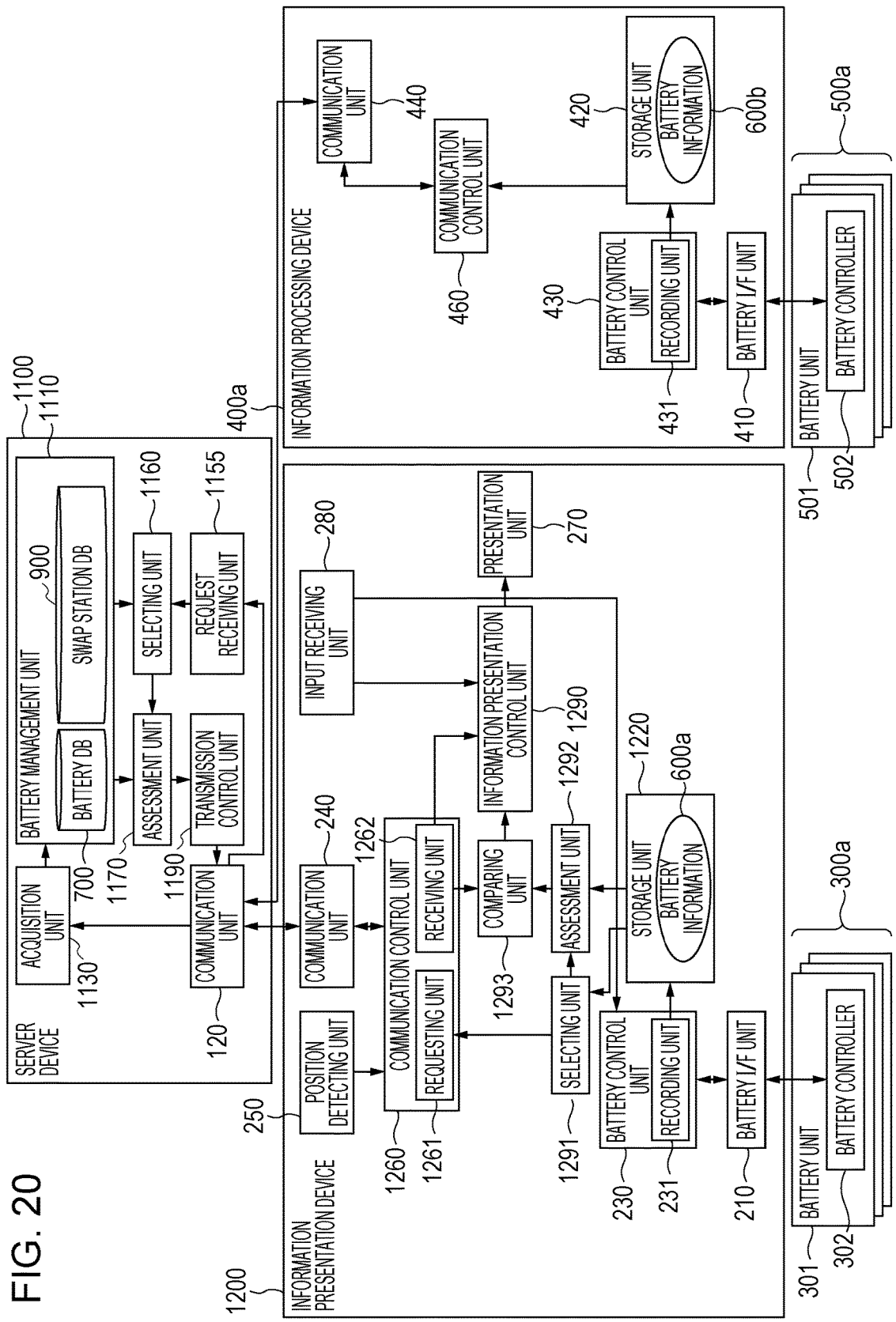
FIG. 20 is a block diagram illustrating an example of a functional configuration of respective device types in an information output system according to Embodiment 2.

FIG. 20 is a block diagram illustrating an example of a functional configuration of respective device types in an information output system according to Embodiment 2. FIG. 20 illustrates only the server device 1100, the information presentation device 1200, the battery 300a, the information processing device 400a, and the battery 500a, whereas other device types are omitted.

Herein, the server device 1100 is realized by a computer equipped with components such as memory, a processor, and a communication circuit. As illustrated in FIG. 20, functionally, the server device 1100 includes a battery management unit 1110, a communication unit 120, an acquisition unit 1130, a request receiving unit 1155, a selecting unit 1160, an assessment unit 1170, and a transmission control unit 1190. With these functions, the server device 1100 executes processes such as a process of transmitting rank information for battery units placed at a swap station (hereinafter called a "rank list") in response to a request from the information presentation device 1200.

The battery management unit 1110 is responsible for the function of successively acquiring and storing information about each battery unit placed at each swap station, and holds various data in a storage medium such as memory or a hard disk. Namely, the battery management unit 1110 includes the battery DB 700 and the swap station DB 900. The battery DB information stored in the battery DB 700 has the data structure described in Embodiment 1 (see FIG. 4), but does not include information (records) about battery units on board vehicles, and includes only information about battery units placed at swap stations.

The communication unit 120 includes a communication circuit, and includes a function of communicating with the information presentation device 1200 and the information processing device 400a. This communication includes, for example, receiving a rank list request from the information presentation device 1200, receiving battery information from the information processing device 400a, and transmitting a rank list to the information presentation device 1200. Note that a rank list request from the information presentation device 1200 is transmitted with the addition of the type of battery unit to be charged (swapped) on board the vehicle, and vehicle position information. Note that the type transmitted by information presentation device 1200 may be input into the information presentation device 1200 in advance by the user of the vehicle, or specified on the basis of a correspondence table between type and battery unit ID or the like.

The acquisition unit 1130 includes a function of acquiring battery information received by the communication unit 120, and transmitting the acquired information to the battery management unit 1110, thereby updating the battery DB 700.

The request receiving unit 1155 includes a function of acquiring and transmitting to the selecting unit 1160 the battery unit type and vehicle position information attached to the rank list request received by the communication unit 120.

The selecting unit 1160 includes a function of acquiring the type and the vehicle position information from the request receiving unit 1155, referencing the battery DB 700 and the swap station DB 900 in the battery management unit 1110, and selecting battery units of the same type located at a swap station near the vehicle. Herein, a swap station located in a direction proceeding toward the destination from the current position within a fixed range (for example, a radius of 5 km) from the current position of the vehicle may be selected on the basis of the vehicle position information as the swap station near the vehicle, for example. Additionally, the information presentation device 1200 may attach information related to the remaining battery charge or range to the rank list request, and a swap station that is reachable with the remaining battery charge (range) may be selected.

The assessment unit 1170 includes a function of executing the battery rank assessment process (see FIG. 11) on each battery unit selected by the selecting unit 1160, and thereby assessing the current rank for each swap candidate battery unit placed at the swap station.

The transmission control unit 1190 includes a function of generating and causing the communication unit 120 to transmit a rank list indicating the ranks assessed by the second assessment unit 170 for each battery unit (battery unit B) selected by the selecting unit 1160. The recipient of the rank list is the information presentation device that requested the rank list.

Note that the respective functions of the acquisition unit 1130, the request receiving unit 1155, the selecting unit 1160, the assessment unit 1170, and the transmission control unit 1190 are realized by a processor executing a control program stored in memory included in the server device 1100.

Also, the information presentation device 1200 on board the vehicle 201a is a car navigation device of the related art with additional functions, such as a function of presenting information related to battery status or battery swapping. In terms of hardware, the information presentation device 1200 is made up of a computer that includes a display device such as an LCD, an input device such as a touchpad, a computer equipped with components such as memory, a processor, and a communication circuit, a GPS receiver, and a battery I/F unit 210. As illustrated in FIG. 20, functionally, the information presentation device 1200 includes a battery I/F unit 210, a storage unit 1220, a battery control unit 230, a communication unit 240, a position detecting unit 250, a communication control unit 1260, a presentation unit 270, an input receiving unit 280, a selecting unit 1291, an assessment unit 1292, a comparing unit 1293, and an information presentation control unit 1290.

The presentation unit 270 includes a display device that presents information to the user by presenting a display, as well as an audio output device that presents information to the user by outputting audio.

The input receiving unit 280 includes an input device such as a touchpad, and includes a function of receiving information or instructions input by the user, and transmitting the received information and instructions to the information presentation control unit 1290 and the battery control unit 230.

The battery I/F unit 210 is an interface that connects the information presentation device 1200 to each battery unit 301 constituting the battery 300a, and includes a function of enabling communication with the battery controller 302 of each battery unit 301.

The storage unit 1220 is a storage medium such as memory for storing battery information 600a, which is information indicating the battery status.

The battery control unit 230 includes a recording unit 231, and is responsible for the following respective functions by executing the battery control process (see FIG. 7). Namely, according to a specific user operation received by the input receiving unit 280, the battery control unit 230 is responsible for a function of controlling the charging of a battery unit 301 connected via the battery I/F unit 210. In addition, with the recording unit 231, the battery control unit 230 is responsible for a function of acquiring various information indicating the battery status from the battery controller 302 when charging or at fixed time intervals, and recording battery information 600a in the storage unit 1220.

The communication unit 240 includes a communication circuit, and includes a function of communicating with the server device 1100.

The position detecting unit 250 includes a GPS receiver, and includes a function of acquiring the current position of the vehicle 201a.

The communication control unit 1260 includes a function of controlling the communication unit 240, and includes a requesting unit 1261 that transmits the rank list request to the server device 1100 via the communication unit 240, and a receiving unit 1262 that receives the rank list from the server device 1100 via the communication unit 240.

The requesting unit 1261 includes a function of controlling the transmission of the rank list request when the selecting unit 1291 selects a battery unit to be charged (swapped). Note that the requesting unit 1261 controls transmission so that vehicle position information generated from the current position of the vehicle 201a acquired by the position detecting unit 250 and a destination of the vehicle 201a input by the user, as well as the battery unit types, are attached to the rank list request.

The receiving unit 1262 includes a function of receiving the rank list and transmitting the received rank list, or in other words information, including rank, that is related to each battery unit placed at the swap station, to the comparing unit 1293 and the information presentation control unit 1290.

The selecting unit 1291 includes a function in which, if a battery unit to be charged (swapped) exists among the battery units on board the vehicle 201a, the selecting unit 1291 selects the one or multiple battery units to be charged (swapped). Note that, in order to select battery units, the selecting unit 1291 executes the swap battery selection process (see FIG. 10) by referencing the battery information 600a stored in the storage unit 1220.

The assessment unit 1292 includes a function of executing the battery rank assessment process (see FIG. 11) on each battery unit selected by the selecting unit 1291, and thereby assessing the current rank for each battery unit to be swapped.

The comparing unit 1293 includes a function of comparing the rank assessed by the assessment unit 1292 for each battery unit selected by the selecting unit 1291 to the rank for each battery unit indicated in the rank list transmitted from the receiving unit 1262. Note that the comparison result is transmitted to the information presentation control unit 1290.

The information presentation control unit 1290 includes a function of, in response to the comparison result transmitted from the comparing unit 1293, deciding content to display on-screen and content to output as audio on the basis of the rank list transmitted from the receiving unit 1262, and controlling the presentation unit 270 to present the display and output the audio. In addition, the information presentation control unit 1290 also includes a function of displaying or outputting audio of the battery status on the basis of the battery information 600a.

Note that the respective functions of the battery control unit 230, the communication control unit 1260, the selecting unit 1291, the assessment unit 1292, the comparing unit 1293, and the information presentation control unit 1290 are realized by a processor executing a control program stored in memory included in the information presentation device 1200.

Also, the information processing device 400a installed in the swap station 401a includes a function of transmitting the status of batteries placed at the swap station 401a to the server device 1100.

(Operation)

Hereinafter, operations of each device type in the information output system equipped with the configurations discussed above will be described. Particularly, the following is an example of presentation information (also called output information) in the information presentation device 1200 on board the vehicle 201a, and mainly describes operations for presenting swap information, which is information related to battery swapping (a swap information presentation process).

Figure 21:
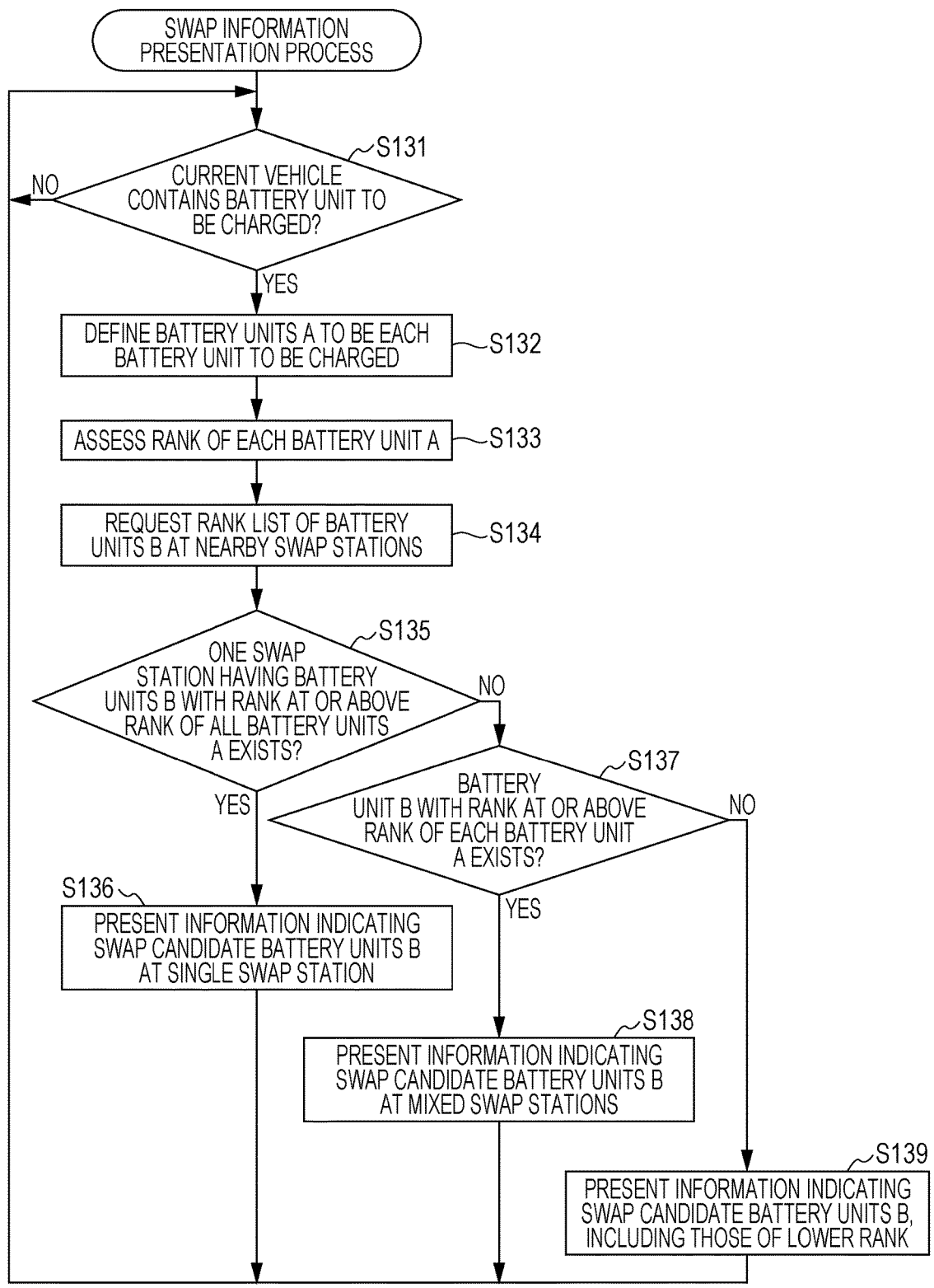
FIG. 21 is a flowchart illustrating an example of a swap information presentation process.

FIG. 21 is a flowchart illustrating an example of a swap information presentation process executed by the information presentation device 1200.

The selecting unit 1291 of the information presentation device 1200 references the battery information 600a of the storage unit 1220, and checks for a battery unit to be charged from among the battery units on board the vehicle 201a (step S131). The check is repeated if no such battery unit exists. If a battery unit to be charged exists, each battery unit to be charged is defined to be a battery unit A to be swapped (step S132). Specifically, the selecting unit 1291 references the charge level 603 of the battery information 600a, and assesses the range of the vehicle 201a from the charge level of each battery unit on board the vehicle 201a. Subsequently, if the assessed range is less than a predetermined threshold value (for example, 25 km), the selecting unit 1291 selects one or more battery units to be charged so that the range will become equal to or greater than a predetermined value (for example, 50 km). This selection of one or more battery units to be charged is conducted by a sequence that selects battery units in order of lowest charge level 603, assumes that the battery unit is changed to an 80% charge state (that is, assumes that a battery unit at 80% charge is swapped in), and ends selection if the range becomes equal to or greater than the predetermined value as a result, for example.

After step S132, the assessment unit 1292 assesses a rank corresponding to performance for each battery unit A (step S133). In other words, for each battery unit A selected by the selecting unit 1291, the assessment unit 1292 references the history information 610 of the battery information 600a, and uses the table group illustrated in FIGS. 12 to 18 to conduct the battery rank assessment process (see FIG. 11).

Next, the requesting unit 1261 controls the transmission of the rank list request to the server device 1100 (step S134). The requesting unit 1261 adds vehicle position information and rank to the rank list request for transmission.

In response to the rank list request, a rank list indicating the rank of each battery unit B placed at the swap station is transmitted from the server device 1100 by the action of the request receiving unit 1155, the selecting unit 1160, the assessment unit 1170, and the transmission control unit 1190 discussed earlier. The rank list is transmitted by the receiving unit 1262 of the information presentation device 1200 to the comparing unit 1293 and the information presentation control unit 1290.

Consequently, the comparing unit 1293 of the information presentation device 1200 judges whether or not one swap station having battery units B with a rank at or above the ranks of all battery units A exists (step S135). For the user of the vehicle 201a, this judgment means whether or not the user is able to go to one swap station and swap in candidate battery units at the same or higher rank.

In step S135, if the comparing unit 1293 judges that a swap station having such battery units B exists, the information presentation control unit 1290 generates and presents swap information which indicates the battery units B at that swap station (step S136). The swap information generated at this point includes information about the battery units A from the battery information 600a (see FIG. 3), information on the ranks assessed for the battery units A, information about the relevant battery units B, information on the ranks assessed for those battery units B, and information related to the swap station illustrated in FIG. 6 (such as location information).

In the case of judging in step S135 that one swap station having battery units B with a rank at or above the ranks of all battery units A does not exist, it is judged whether or not such battery units B exist distributed among multiple swap stations (step S137). As a result of the judgment in step S137, if it is judged that such battery units B exist distributed among multiple swap stations, the information presentation control unit 1290 generates and presents swap information which indicates the battery units B which exist distributed at swap stations (step S138). Also, in the judgment in step S137, if the number of battery units B, with a rank at or above the ranks of all battery units A, is less than the number of battery units A, the information presentation control unit 1290 generates and presents swap information indicating battery units B, including battery units B of lower rank than the battery units A (step S139). Note that the presentation of swap information (steps S136, S138, and S139) is the presentation of a display or the output of audio of the swap information by the presentation unit 270.

According to a screen and the like output by the presentation unit 270 of the information presentation device 1200 in this way, the user of the vehicle 201a becomes able to obtain information related to a comparison result of a rank corresponding to battery performance when swapping batteries. Note that if the user confirms the information related to battery unit swapping via the display device and the like of the information presentation device 1200, and provides specific input indicating confirmation, for example, the information presentation device 1200 may transmit information for reserving a battery swap at the swap station. Also, if the user provides specific input, the information presentation device 1200 may also display a map indicating a route guiding the vehicle from the current position to the swap station on the display device, and output guidance messages from the audio output device.

(Modifications)

The above thus describes embodiments of an information output system that realizes an information output method, but the embodiments discussed above are merely examples, and obviously various alterations are possible.

Figure 22:
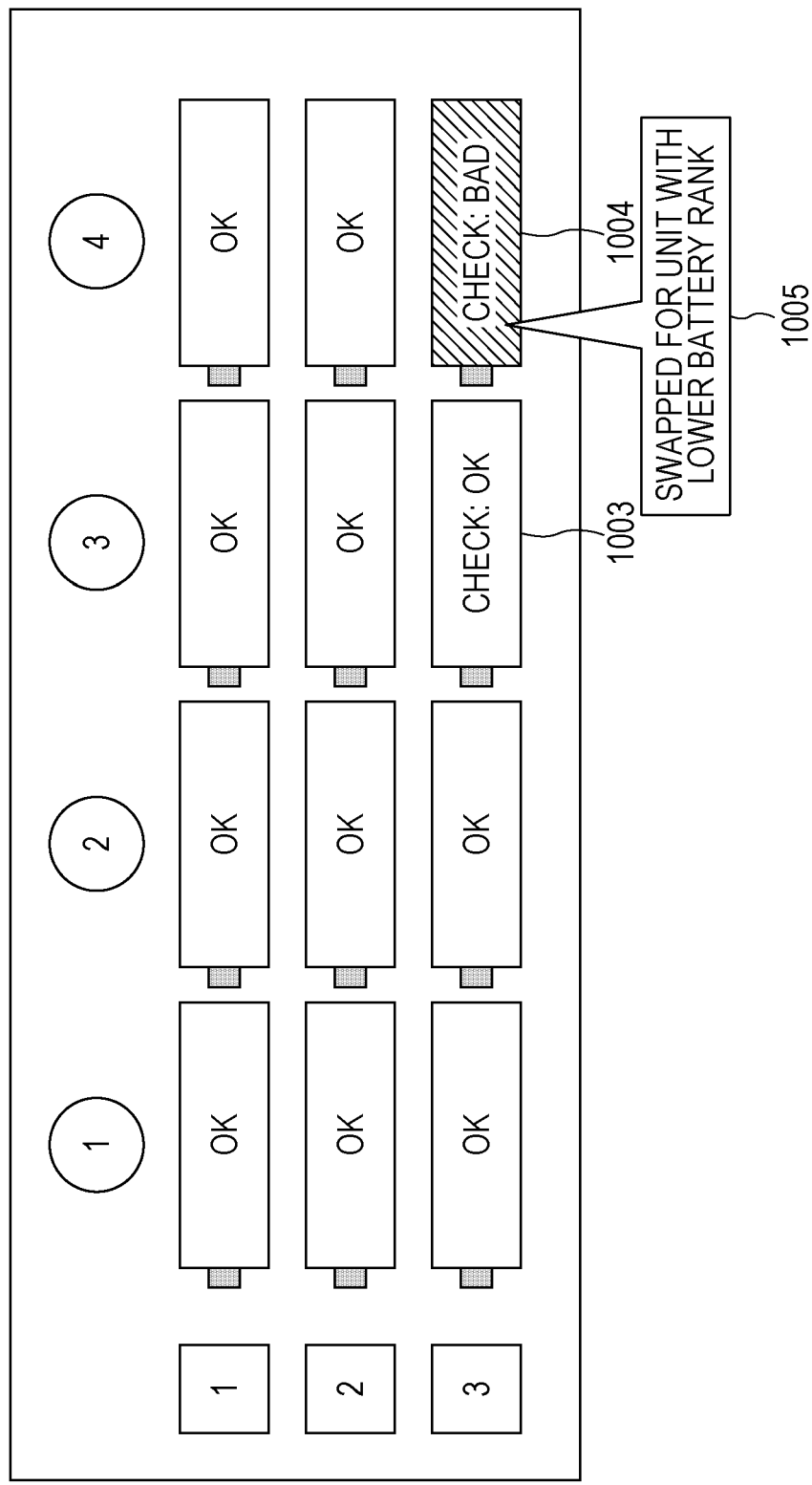
FIG. 22 is a diagram illustrating an example of a battery swap screen display (after battery swap)

Embodiments 1 and 2 illustrate a method in which, before swapping out battery units on board a vehicle, the rank of battery units in the vehicle are compared to the ranks of battery units at a swap station, and on the basis of the comparison result, swap information is output from a device such as a computer. This comparison of rank and output of information based on the comparison result may also be conducted after swapping battery units. If conducted after swapping, battery units removed from the vehicle by swapping (first battery units) and battery units newly installed on board the vehicle by swapping (second battery units) are respectively specified. This specification may be conducted by detecting that, due to the swap from a first battery unit to a second battery unit, in the battery information stored in a storage unit, the battery unit ID of the first battery unit changes from the battery unit ID of the first battery unit to the battery unit ID of the second battery unit. In other words, the rank of the first battery unit removed from the vehicle by swapping may be compared to the rank of the second battery unit newly installed in the vehicle by swapping, and in accordance with the comparison result, information related to a swap result (output information or presentation information), such as information indicating that the rank has lowered, for example, may be output. Note that information related to a battery unit swap result output from a device such as a computer is presented to the user via a display device or an audio output device. FIG. 22 is a diagram illustrating an example of a screen displayed on a display device regarding a battery unit swap result. On the example screen illustrated in FIG. 22, a battery mark 1003 and a battery mark 1004 indicate that the battery units in the third row, third column and third row, fourth column have been swapped. In addition, the battery mark 1003 indicates that a battery unit of equal or higher rank has been swapped in, whereas the battery mark 1004 and the message 1005 indicate that a battery unit of lower rank than before the swap has been swapped in, in order to alert the user.

Also, although the vehicle illustrated in the exemplary embodiments is an electric car, it is sufficient for the vehicle to include a mechanism that drives an electric motor causing the vehicle to travel with electric power from a secondary battery, and the vehicle additionally may be equipped with an engine. Also, it is sufficient for the vehicle to include an on-board battery that is swappable, and the vehicle may also not include a function of charging the battery.

Additionally, the swap battery selection process for selecting a battery unit to be charged (steps S51 to S53) is merely an example. For example, when the charge level (remaining battery charge) falls to or below a fixed lower limit as a result of discharging, that battery unit may be selected.

In addition, the battery DB information in the battery DB 700 may also include a rank assessed for each battery unit, and the swap station DB information in the swap station DB 900 may also include the names of swap stations or other information related to swap stations.

In addition, the way of utilizing a comparison result regarding the ranks of the battery units A and the battery units B in the swap information output process (see FIG. 9) and the swap information presentation process (see FIG. 21) (steps S36 to S40 and S135 to S139) are merely examples, and a variety of different modifications are possible. For example, a modification is possible in which, in the case of a positive judgment in step S38, a number of battery units B at the closest swap station from the position of the vehicle and equal to the number of battery units A are extracted in order of highest rank, and swap information indicating those battery units B and the like is output. Also, in the comparison of rank between a battery unit A and a battery unit B by the comparing unit 180 or the comparing unit 1293, a comparison result may be output that distinguishes between the case of both ranks being equal, the case of the rank of the battery unit A being higher, and the case of the rank of the battery unit B being higher. In this case, the information presentation control unit 290 or the information presentation control unit 1290 may present a display on the display device and the like in different formats (such as in different colors) according to whether a swap candidate for a battery unit A is the same rank, a higher rank, or a lower rank, for example. Also, a display may be presented in different formats according to whether a swap candidate for a battery unit A is the same or higher rank, or a lower rank. Also, information about only swap candidate battery units B of the same or higher rank as a battery unit A (such as rank or swap station information) may be displayed.

Note that outputting the result of comparing ranks between battery units that may be swapped or battery units that have been swapped is valuable for the user because the user may be made to recognize differences in the performance of battery units, or in other words differences in value, which are distinct from different charge levels, for example. Note that the output of a comparison result acts as a presentation of information (various information reflecting the comparison result) to the user via a display device and the like, or as control or the like of another device type, such as the transmission of reservation information.

Also, regarding the display format, the battery marks 1001 and 1002 in the example screen in FIG. 19 may be modified to indicate the identification information or rank of the battery units on board the vehicle, or to indicate the identification information or location information of battery units to be installed on board the vehicle by swapping, for example.

In addition, in the assessment of the rank of a battery unit (see FIG. 11), the charge count, fast charge count, full charge ratio, low charge count, high temperature period, and age constituting the battery unit history information are used, but a portion of these, or in other words one or a combination of several of the above, may also be used. Of these, rank assessment may be conducted using just the charge count, for example, so that the rank is lower for a larger charge count. Also, rank assessment may be conducted using just the fast charge count, so that the rank is lower for a larger fast charge count. Also, rank assessment may be conducted using just the full charge ratio, so that the rank is higher for a higher full charge ratio. Also, rank assessment may be conducted using just the low charge count, so that if the low charge count is one or more times, the rank is lower than if the low charge count is zero times. Also, rank assessment may be conducted using just the high temperature period, so that if the high temperature period is not zero hours, the rank is lower than if the higher temperature period is zero hours. Also, rank assessment may be conducted using just the age, so that the rank is lower for a greater age. Note that although categories such as AAA or A are used in the exemplary embodiment in order to express the degree of rank, the expression of rank is not limited thereto, and rank may also be expressed with a numerical value, for example. As another example, battery units with different ranks may be subjected to a rank assessment so that the discharge performance differs from each other.

Also, the selection of battery units to be swapped that are on board a vehicle and battery units to be swapped that are not on board a vehicle (for example, located at a swap station) may also be conducted outside the information output system. In the information output system, if it is possible to at least acquire information specifying a pair of battery units to be swapped (including a candidate for swapping), information related to the battery performance of each battery unit (such as history information) may be acquired, and the rank of each battery unit may be assessed and compared. Consequently, the information output system becomes able to output information based on the rank comparison result (output information or presentation information). Note that it is also possible to modify the functional roles of each device type in the information output system.

Note that all or part of the various processes by each device type discussed above (such as the processes illustrated in FIGS. 7 to 11 and FIG. 21) may be executed by the mechanism (hardware) of each device type, or executed by software. Note that the execution of a process by software is the realization of the process as a result of a processor included in each device type executing a control program stored in memory. Also, such a control program may be recorded to a recording medium and circulated or distributed. For example, by installing a distributed control program onto a device type and causing the processor of the device type to execute the control program, it becomes possible to cause the device type to conduct various processes (such as the processes illustrated in FIGS. 7 to 11 and FIG. 21).

Figure 23:
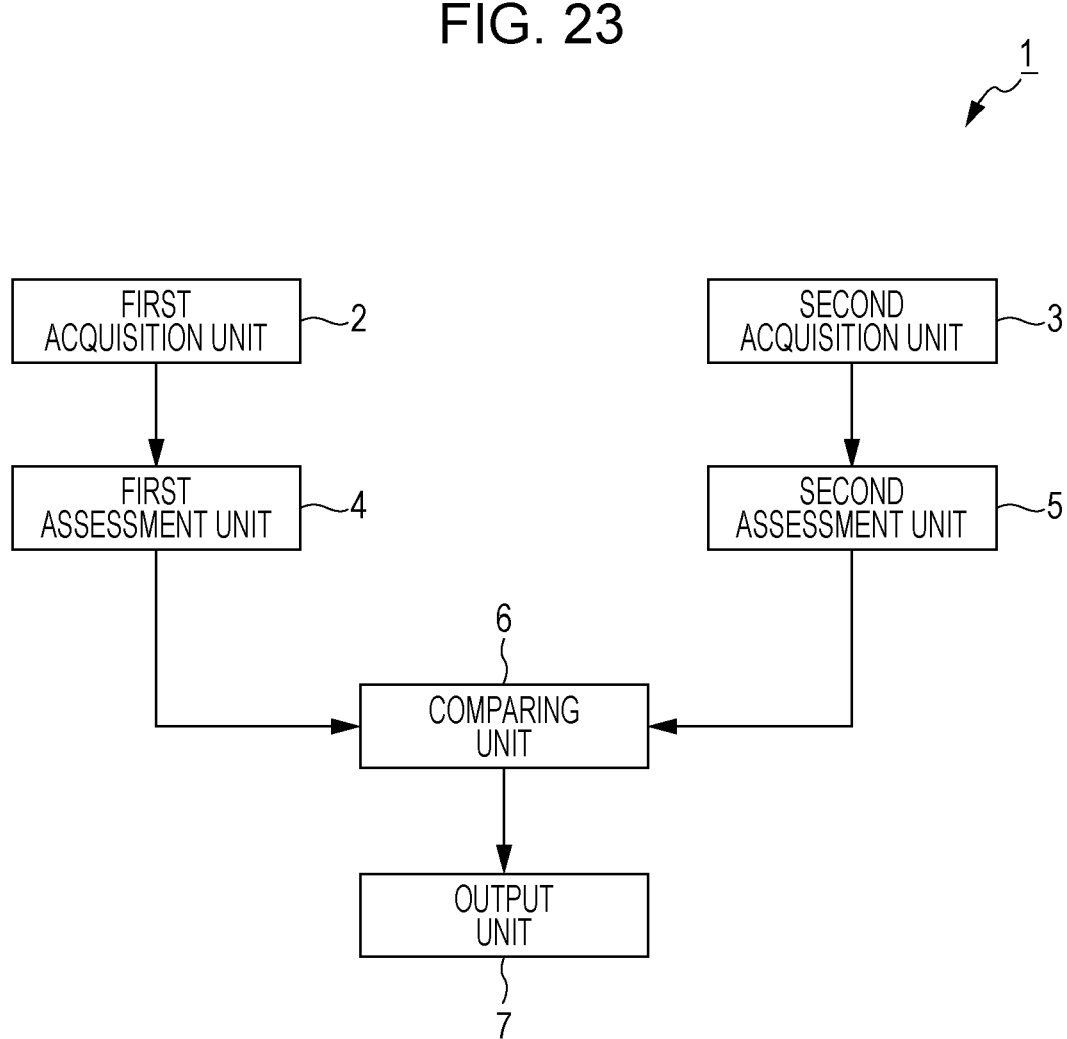
FIG. 23 is a diagram illustrating an example of an information output system according to an aspect of the present disclosure.

Also, FIG. 23 is a diagram illustrating an example of an information output system according to an aspect of the present disclosure. The information output system 1 according to an embodiment of the present disclosure is an information output system that outputs information when swapping a secondary battery for powering a vehicle, and includes: a first acquisition unit 2 that acquires first history information recording phenomena that affect the performance of a first battery unit (battery unit A) on board the vehicle; a second acquisition unit 3 that acquires second history information recording phenomena that affect the performance of a second battery unit (battery unit B) that is installable on board the vehicle in place of the first battery unit; a first assessment unit 4 that assesses a rank related to the performance of the first battery unit on the basis of the first history information; a second assessment unit 5 that assesses a rank related to the performance of the second battery unit on the basis of the second history information; a comparing unit 6 that compares the rank of the first battery unit to the rank of the second battery unit; and an output unit 7 that outputs output information according to the result of the comparison by the comparing unit 6.

Otherwise, embodiments obtained by performing various modifications that would naturally occur to persons skilled in the art on the exemplary embodiments discussed in the foregoing, or embodiments realized by arbitrarily combining the structural elements and functions indicated in the exemplary embodiments, are also included in the scope of the present disclosure.

The present disclosure is usable in an information output method, an information presentation device, and an information output system that provides information valuable to a user of a vehicle carrying a swappable secondary battery.

What is claimed is:

1. A method, for determining when a first battery within a vehicle should be swapped with a second battery at a swap station, performed by a server apparatus, the server apparatus including a processor and a memory storing identification information that identifies the swap station and location information that indicates a location of the swap station, the method comprising:

acquiring, using the processor, first battery information from an information presentation device within the vehicle, wherein the first battery information includes i) a charge level of the first battery within the vehicle, and ii) first history information about the first battery, wherein the first history information indicates a first value related to performance of the first battery;

assessing, using the processor, a first rank of the first battery based on the first value indicated by the acquired first history information when the charge level of the first battery is lower than a predetermined level;

acquiring, using the processor, the identification information and second battery information from an information processing device that manages the second battery that is placed at the swap station, wherein the second battery information includes second history information about the second battery, wherein the second history information indicates the second value related to performance of the second battery, and wherein the second battery is installable in the vehicle in place of the first battery;

assessing, using the processor, a second rank of the second battery based on the second value indicated by the acquired second history information;

comparing, using the processor, the assessed first rank of the first battery within the vehicle to the assessed second rank of the second battery placed at the swap station;

generating, using the processor, output information that includes information indicating the location of the swap station based on the location information stored in the memory when the processor determines that the assessed second rank is equal to or higher than the assessed first rank; and outputting, using the processor, the generated output information to the information presentation device of the vehicle to guide the vehicle to the swap station.

2. The method according to claim 1,
wherein the first value comprises a charge count of the first battery, and the first rank of the first battery is assessed at a lower rank, as the charge count of the first battery becomes larger, and
wherein the second value comprises a charge count of the second battery, and the second rank of the second battery is assessed at a lower rank, as the charge count of the second battery becomes larger.

3. The method according to claim 1,
wherein the first value comprises a fast charge count of the first battery, and the first rank of the first battery is assessed at a lower rank, as the fast charge count of the first battery becomes larger,
wherein the second value comprises a fast charge count of the second battery, and the second rank of the second battery is assessed at a lower rank, as the fast charge count of the second battery becomes larger.

4. The method according to claim 1,
wherein the first value comprises a full charge ratio of the first battery, and the first rank of the first battery is assessed at a higher rank, as the full charge ratio of the first battery becomes higher, and
wherein the second value comprises a full charge ratio of the second battery, and the second rank of the second battery is assessed at a higher rank, as the full charge ratio of the second battery becomes higher.

5. The method according to claim 1,
wherein the first value includes information indicating whether or not a charge ratio of the first battery has fallen below a first prescribed threshold value,
wherein the first rank of the first battery is assessed at a lower rank if the number of times when the charge ratio of the first battery has fallen below the first prescribed threshold value becomes equal to or more than one, and the first rank of the first battery is assessed at a higher rank if the number of times when the charge ratio of the first battery has fallen below the first prescribed threshold value is equal to zero,
wherein the second value includes information indicating whether or not a charge ratio of the second battery has fallen below a second prescribed threshold value, and
wherein the second rank of the second battery is assessed at a lower rank if the number of times when the charge ratio of the second battery has fallen below the second prescribed threshold value becomes equal to or more than one, and the second rank of the second battery is assessed at a higher rank if the number of times when the charge ratio of the second battery has fallen below the second prescribed threshold value is equal to zero.

6. The method according to claim 1,
wherein the first value includes information indicating whether or not a temperature of the first battery has become equal to or greater than a prescribed temperature,
wherein the first rank of the first battery is assessed at a lower rank if the number of times when the temperature of the first battery has become equal to or greater than the prescribed temperature becomes equal to or more than one, and the first rank of the first battery is assessed at a higher rank if the number of times when the temperature of the first battery has become equal to or greater than the prescribed temperature is equal to zero,
wherein the second value includes information indicating whether or not a temperature of the second battery has become equal to or greater than the prescribed temperature,
wherein the second rank of the second battery is assessed at a lower rank if the number of times when the temperature of the second battery has become equal to or greater than the prescribed temperature becomes equal to or more than one, and the second rank of the second battery is assessed at a higher rank if the number of times when the temperature of the second battery has become equal to or greater than the prescribed temperature is equal to zero.

7. The method according to claim 1,
wherein the first value includes information indicating an elapsed time since manufacture of the first battery,
wherein the second values includes information indicating an elapsed time since manufacture of the second battery,
wherein the first rank of the first battery is assessed at a lower rank as the elapsed time since manufacture of the first battery becomes longer, and wherein the second rank of the second battery is assessed at a lower rank as the elapsed time since manufacture of the second battery becomes longer.

8. The method according to claim 1, wherein the rank of the first battery is changed in accordance with change about discharge performance of the first battery, and the second rank of the second battery is changed in accordance with change about discharge performance of the second battery.

9. The method according to claim 1, wherein the first battery is of a same type in terms at least one of shape and size as the second battery.

10. The method according to claim 1, further comprising: outputting, to the information processing device, reservation information for reserving swap of the second battery at the swap station.

11. The method according to claim 1, wherein the second value comprises at least one selected from i) a charge count of the second battery, ii) a fast charge count of the second battery, iii) a full charge ratio of the second battery, iv) information indicating whether or not a charge ratio of the second battery has fallen below a prescribed threshold value, v) information indicating whether or not a temperature of the second battery has become equal to or greater than a prescribed temperature, and vi) information indicating an elapsed time since manufacture of the second battery.

12. The method according to claim 1, wherein the output information further includes information indicating the second rank of the second battery and identification of the second battery.

13. The method according to claim 1, wherein the output information is displayed at the information presentation device in a first format when the second rank is equal to the first rank, and the output information is displayed at the information presentation device in a second format distinguishable from the first format when the second rank is higher than the first rank.

14. The method according to claim 1, further comprising: generating, using the processor, output information indicating the location of the swap station and alert information when the second rank is lower than the first rank, wherein the alert information indicates that the second rank is lower than the first rank, wherein, in the outputting, the generated alert information is further output to the information presentation device.

15. The method according to claim 1, wherein the first value includes at least one selected from i) a charge count of the first battery, ii) a fast charge count of the first battery, iii) a full charge ratio of the first battery, iv) information indicating whether or not a charge ratio of the first battery has fallen below a prescribed threshold value, v) information indicating whether or not a temperature of the first battery has become equal to or greater than a prescribed temperature, and vi) information indicating an elapsed time since manufacture of the first battery.

16. The method according to claim 1, further comprising: in the acquiring of the first battery information, vehicle location information is further acquired from the information presentation device, wherein the vehicle location information indicates a current position of the vehicle, wherein the first rank of the first battery is compared to the second rank of the second battery, when the swap station that places the second battery is located within a fixed range from the current position indicated by the vehicle location information.

17. A method, for determining when a first battery within a vehicle should be swapped with a second battery at a swap station, performed by a server apparatus, the server apparatus including a processor and a memory storing identification information that identifies the swap station and location information that indicates a location of the swap station, the method comprising:

acquiring, using a processor, first battery information from an information presentation device within the vehicle, wherein first battery information includes i) charge levels of first batteries within the vehicle, and ii) first history information about the first batteries, wherein the first history information indicating first values relates to performances of the first batteries;

selecting, using the processor, two first batteries from among the first batteries within the vehicle, wherein charge levels of the two first batteries are lower than a predetermined level, and wherein the charge levels of the two first batteries are included in the acquired first battery information;

assessing respective first ranks of the two first batteries, based on the first values, related to performances of the two first batteries, indicated by the acquired first history information;

acquiring, using the processor, the identification information and second battery information from an information processing device that manages second batteries that are placed at the swap station, wherein second battery information includes second history information about the second batteries, wherein the second history information indicates second values related to performances of the second batteries, wherein the second batteries are installable in the vehicle in place of the first batteries;

assessing second ranks of the second batteries, based on the second values indicated by the acquired second history information;

comparing the assessed first ranks of the two first batteries within the vehicle to the assessed second ranks of second batteries placed at the swap station;

determining, using the processor, whether the swap station places third batteries, wherein the third batteries are at least two second batteries among the second batteries, wherein each of the assessed second ranks of the at least two second batteries is equal to or higher than the highest rank in the assessed first ranks of the two first batteries;

generating, using the processor, output information that includes information indicating the location of the swap station based on the location information stored in the memory when the processor determines that the swap station places the third batteries; and outputting, using the processor, the generated output information to the information presentation device of the vehicle to guide the vehicle to the swap station.

18. A server apparatus for determining when a first battery within a vehicle should be swapped with a second battery at a swap station, the server apparatus comprising:

a memory that stores identification information that identifies the swap station and location information that indicates a location of the swap station; and a processor, wherein the memory further stores a computer program, which when executed by the processor, causes the processor to perform operations including acquiring first battery information from an information presentation device within the vehicle, wherein the first battery information includes i) a charge level of the first battery within the vehicle, and ii) history information about the first battery, wherein the history information indicates a first value related to performance of the first battery;

assessing assess a first rank of the first battery, based on the first value indicated by the acquired history information when the charge level of the first battery is lower than a predetermined level;

acquiring the identification information and second battery information from an information processing device that manages the second battery that is placed at the swap station, wherein the second battery information includes second history information about the second battery, wherein the second history information indicates a second value related to performance of the second battery, and wherein the second battery is installable in the vehicle in place of the first battery;

assessing a second rank of the second battery based on the second value indicated by the acquired second history information;

comparing the assessed first rank of the first battery within the vehicle to the assessed second rank of the second battery placed at the swap station;

generating, using the processor, output information that includes information indicating the location of the swap station based on the location information stored in the memory when the processor determines that assessed second rank is equal to or higher than the assessed first rank; and outputting the generated output information to the information presentation device of the vehicle to guide the vehicle to the swap station.

19. An information presentation device, for determining when a first battery within a vehicle should be swapped with a second battery at a swap station, comprising:

a storage medium storing first battery information including i) a charge level of the first battery within the vehicle, and ii) history information about the first battery, wherein the history information indicating the first value related to performance of the first battery;

a processor; and a memory storing thereon a computer program, which when executed by the processor, causes the processor to perform operation including transmitting to a server apparatus, the first battery information when the charge level of the first battery is lower than a predetermined level;

receiving from the server apparatus, rank information indicating a second rank of the second battery and location information indicating a location of the swap station at which the second battery is placed, wherein the second rank of the second battery is assessed based on a second value related to performance of the second battery, wherein the second battery is a battery that is installable in the vehicle in place of the first battery, and that is placed at the swap station;

assessing a first rank of the first battery based on the first value indicated by the history information read out from the storage medium;

comparing the assessed first rank of the first battery within the vehicle to the second rank of the second battery that is placed at the swap station and that is indicated by the received rank information;

generating presentation information that includes information indicating the location of the swap station based on the received location information when the processor determines that the assessed second rank is equal to higher than the assessed first rank; and controlling a display device to display the generated presentation information to guide the vehicle to the swap station.

20. The information presentation device according to claim 19, wherein the presentation information further includes i) information indicating the second rank of the second battery, ii) identification information of the second battery, and iii) information indicating the assessed first rank of the first battery.

21. The information presentation device according to claim 20, wherein the presentation information further includes a map indicating a route guiding the vehicle from a current position of the vehicle to the location of the swap station.

* * * * *